(12) United States Patent
Ryu et al.

(10) Patent No.: US 12,197,247 B2
(45) Date of Patent: Jan. 14, 2025

(54) DISPLAY DEVICE AND TOUCH INPUT SYSTEM INCLUDING THE SAME

(71) Applicant: SAMSUNG DISPLAY CO., LTD., Yongin-si (KR)

(72) Inventors: Ji Hun Ryu, Hwaseong-si (KR); Won Ki Hong, Suwon-si (KR); Su Yul Seo, Incheon (KR); Kyung Min Choi, Seoul (KR); Jeong An Hong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 242 days.

(21) Appl. No.: 17/981,820

(22) Filed: Nov. 7, 2022

(65) Prior Publication Data
US 2023/0297136 A1    Sep. 21, 2023

(30) Foreign Application Priority Data

Feb. 14, 2022    (KR) .......................... 10-2022-0018613

(51) Int. Cl.
*G06F 1/16*    (2006.01)
*G06F 3/044*    (2006.01)

(52) U.S. Cl.
CPC .......... *G06F 1/1643* (2013.01); *G06F 1/1616* (2013.01); *G06F 1/1652* (2013.01); *G06F 3/0441* (2019.05); *G06F 3/0442* (2019.05); *G06F 2203/04102* (2013.01)

(58) Field of Classification Search
CPC ........................................................ H05K 7/00
See application file for complete search history.

(56) References Cited

U.S. PATENT DOCUMENTS

| | | | |
|---|---|---|---|
| 10,656,684 B2 | 5/2020 | Wood et al. | |
| 10,943,529 B2 | 3/2021 | Myers et al. | |
| 11,009,921 B1* | 5/2021 | Bharadwaj | G06F 1/1694 |
| 2016/0118616 A1* | 4/2016 | Hiroki | G09F 9/301 |
| | | | 257/40 |

FOREIGN PATENT DOCUMENTS

| | | |
|---|---|---|
| KR | 10-2016-0124289 | 10/2016 |
| KR | 10-2017-0061313 | 6/2017 |
| KR | 10-2019-0071177 | 6/2019 |

* cited by examiner

*Primary Examiner* — Jerry Wu
(74) *Attorney, Agent, or Firm* — F. CHAU & ASSOCIATES, LLC

(57) ABSTRACT

A display device including a display panel comprising at least one folding area. At least one elasticity-adjusting unit that changes an elastic force of the at least one folding area. An elasticity-adjusting circuit adjusting an elastic modulus for the at least one elasticity-adjusting unit in response to a change of a folding state of the at least one folding area. The at least one elasticity-adjusting unit has a width substantially equal to a width of the at least one folding area and the at least one elasticity-adjusting unit is disposed on a rear surface of the at least one folding area.

19 Claims, 19 Drawing Sheets

DISPLAY DEVICE AND TOUCH INPUT SYSTEM INCLUDING THE SAME

This application claims priority under 35 U.S.C. § 119 to Korean Patent Application No. 10-2022-0018613, filed on Feb. 14, 2022 in the Korean Intellectual Property Office, disclosure of which is incorporated by reference in its entirety herein.

1. TECHNICAL FIELD

The present disclosure relates to a display device and a touch input system including the same.

2. DISCUSSION OF RELATED ART

Display devices are being applied to an increasing variety of electronic devices as the information-oriented society evolves. For example, display devices are being applied in electronic devices such as smart phones, digital cameras, laptop computers, navigation devices, and smart televisions.

Display devices include flat panel display devices such as a liquid-crystal display device, a field emission display device, and an organic light-emitting display device. Among such flat panel display devices, an organic light-emitting display device includes a light-emitting element that can emit light on its own, so that each of the pixels of the display panel can emit light for displaying images without needing a backlight unit that supplies light to the display panel.

Recently, a display device that supports a touch input using a part of a user's body (e.g., a finger) and a touch input using an electronic pen has been developed. By sensing a touch input with an electronic pen or the like, the display device can sense the touch input more precisely than a display device using only a touch input by a part of the user's body.

SUMMARY

Aspects of embodiments of the present disclosure provide a display device capable of adjusting the elastic force of folding areas in response to changes of the usage state of foldable and rollable display devices and the usage environment, and a touch input system including the same.

Aspects of the present disclosure also provide a display device capable of changing the elastic force of folding areas according to a touch location of a touch input device such as an electronic pen, and a touch input system including the same.

It should be noted that objects of embodiments of the present disclosure are not limited to the above-mentioned object; and other objects of embodiments of the present disclosure will be apparent to those skilled in the art from the following descriptions.

According to an embodiment of the present disclosure, a display device includes a display panel comprising at least one folding area. At least one elasticity-adjusting unit that changes an elastic force of the at least one folding area. An elasticity-adjusting circuit adjusting an elastic modulus for the at least one elasticity-adjusting unit in response to a change of a folding state of the at least one folding area. The at least one elasticity-adjusting unit has a width substantially equal to a width of the at least one folding area and the at least one elasticity-adjusting unit is disposed on a rear surface of the at least one folding area.

In an embodiment, the at least one folding area is disposed between a plurality of non-folding areas and is foldable inwardly or outwardly in a first direction or a second direction that crosses the first direction.

In an embodiment, the elasticity-adjusting circuit generates a control signal to a power supply connected to the at least one elasticity-adjusting unit for adjusting the elastic modulus of the at least one elasticity-adjusting unit in a third direction. The adjusting of the elastic modulus of the at least one elasticity-adjusting unit changes a thickness and elasticity of the at least one folding area in the third direction that is a thickness direction of the at least one folding area.

In an embodiment, the at least one elasticity-adjusting unit comprises at least one elasticity-adjusting member. The at least one elasticity-adjusting member comprises a first planar electrode and a second planar electrode in parallel to the first planar electrode with an elastic member having a variable elastic modulus interposed therebetween.

In an embodiment, the elasticity-adjusting unit comprises one elasticity-adjusting member. The elasticity-adjusting unit is disposed on the rear surface of the at least one folding area and has an area substantially equal to an area of the at least one folding area when viewed from top.

In an embodiment, the elasticity-adjusting unit comprises a plurality of elasticity-adjusting members. The plurality of elasticity-adjusting members are arranged in an N×M arrangement on the rear surface of the at least one folding area and has an area substantially equal to the at least one folding area when viewed from top, wherein N and M are natural numbers that are different from each other.

In an embodiment, each of the first and second planar electrodes is formed of a flexible electrode containing at least one metal or alloy. The elastic member having a variable elastic modulus comprises at least one of a magneto-rheological fluid (MR) module and an electro-rheological fluid (ER) module.

In an embodiment, the power supply supplies a predetermined ground voltage to the first planar electrode. The power supply supplies a driving voltage corresponding to one of different levels based on the control signal to the second planar electrode. The elastic member has a variable elastic modulus varying based on a voltage difference between the first planar electrode and the second planar electrode.

In an embodiment, the elasticity-adjusting circuit detects a change in the folding state by detecting a shape of the at least one folding area comprising a folding shape, a flexion shape or a flat shape through at least one inside and outside temperature sensor and at least one Hall sensor. The elasticity-adjusting circuit adjusts the elastic modulus of the elasticity-adjusting unit to different levels in response to a change of the folding shape, the flexion shape and the flat shape.

In an embodiment, the elasticity-adjusting circuit performs at least one of a first control mode sensing an outside temperature when the folding shape is detected and adjusting the elastic modulus of the elasticity-adjusting unit to different levels in response to a change in the outside temperature; a second control mode sensing a change in a flexion angle when the flexion shape is detected and adjusting the elastic modulus of the elasticity-adjusting unit to different levels in response to the change in the flexion angle; a third control mode determining usage of an electronic pen when the flat shape is detected and adjusting the elasticity of the elasticity-adjusting unit to different levels in response to a temperature change of the display panel if it is determined that no electronic pen is used; and a fourth control mode determining a touch location of the electronic pen when the flat shape is detected and it is determined that an electronic pen is used and adjusting the elasticity of the elasticity-adjusting unit to different levels in response to a change in the touch location of the electronic pen.

In an embodiment, the elasticity-adjusting circuit sequentially compares a value of the outside temperature with values of predetermined first to nth reference temperatures in the first control mode, and supplies the control signal of one of Level 1-1 to Level 1-n to the power supply based on results of sequentially comparing the value of the outside temperature with the values of the first to nth reference temperatures. n is a natural number greater than or equal to 2. The power supply supplies a driving voltage corresponding to one of Level 1-1 to Level 1-n to the elasticity-adjusting unit so that the elastic modulus of the elasticity-adjusting unit is changed to a respective elastic modulus corresponding to Level 1-1 to Level 1-n.

In an embodiment, the elasticity-adjusting circuit sequentially compares a flexion angle of the at least one folding area detected through the at least one Hall sensor with predetermined first to nth reference angles in the second control mode, and supplies the control signal of one of Level 2-1 to Level 2-n to the power supply based on results of the sequential comparing. n is a natural number greater than or equal to 2. The power supply supplies a driving voltage corresponding to one of Level 2-1 to Level 2-n to the elasticity-adjusting unit so that the elastic modulus of the elasticity-adjusting unit is changed to a respective elastic modulus corresponding to Level 2-1 to Level 2-n.

In an embodiment, the elasticity-adjusting circuit detects a panel temperature of the display panel in the third control mode, and supplies the control signal of one of Level 3-1 to Level 3-n to the power supply based on results of sequentially comparing the panel temperature with predetermined first to nth panel temperature values. n is a natural number greater than or equal to 2. The power supply supplies a driving voltage corresponding to one of Level 3-1 to Level 3-n to the elasticity-adjusting unit so that the elastic modulus of the elasticity-adjusting unit is changed to a respective elastic modulus corresponding to Level 3-1 to Level 3-n.

In an embodiment, the elasticity-adjusting circuit sequentially compares touch coordinates of the electronic pen with predetermined first to nth area coordinate data in the fourth control mode, and supplies the control signal of one of Level 4-1 to Level 4-n to the power supply based on results of the sequential comparing. n is a natural number greater than or equal to 2. The power supply supplies a driving voltage corresponding to one of Level 4-1 to Level 4-n to the elasticity-adjusting unit so that the elastic modulus of the elasticity-adjusting unit is changed to a respective elastic modulus corresponding to Level 4-1 to Level 4-n.

According to an embodiment of the disclosure, a touch input system comprising a display device for displaying images. The touch input system includes an electronic pen for a touch input on the display device. The display device includes a display panel comprising at least one folding area. At least one elasticity-adjusting unit that changes an elastic force of the at least one folding area. An elasticity-adjusting circuit adjusting an elastic modulus for the at least one elasticity-adjusting unit in response to a change of a shape of the at least one folding area comprising a folding shape, a flexion shape and a flat shape. The at least one elasticity-adjusting unit has a width substantially equal to a width of the at least one folding area and the at least one elasticity-adjusting unit is disposed on a rear surface of the at least one folding area.

In an embodiment, the elasticity-adjusting circuit performs at least one of: a first control mode sensing an outside temperature when the at least one folding area has a folded shape and adjusts the elastic modulus of the elasticity-adjusting unit to different levels in response to a change in the outside temperature; a second control mode sensing a change in a flexion angle when the at least one folding area has a flexion shape and adjusting the elastic modulus of the elasticity-adjusting unit to different levels in response to the change in the flexion angle; a third control mode determining usage of an electronic pen when the at least one folding area has the flat shape and adjusting the elasticity of the elasticity-adjusting unit to different levels in response to a temperature change of the display panel if it is determined that no electronic pen is used; and a fourth control mode determining a touch location of the electronic pen when the at least one folding area has the flat shape and it is determined that the electronic pen is used and adjusting the elasticity of the elasticity-adjusting unit to different levels in response to a change in the touch location of the electronic pen.

In an embodiment, the elasticity-adjusting circuit sequentially compares the outside temperature with predetermined first to $n^{th}$ reference temperatures in the first control mode, and supplies a control signal of one of Level 1-1 to Level 1-n to a power supply connected to the at least one elasticity-adjusting unit based on results of the sequentially comparing. n is a natural number greater than or equal to 2. The power supply supplies a driving voltage corresponding to one of Level 1-1 to Level 1-n to the elasticity-adjusting unit so that the elastic modulus of the elasticity-adjusting unit is changed to a respective elastic modulus corresponding to Level 1-1 to Level 1-n.

In an embodiment, the elasticity-adjusting circuit sequentially compares a flexion angle of the at least one folding area detected through at least one Hall sensor with predetermined first to $n^{th}$ reference angles in the second control mode, and supplies a control signal of one of Level 2-1 to Level 2-n to a power supply connected to the at least one elasticity-adjusting unit based on results of the sequential comparing. The power supply supplies a driving voltage corresponding to one of Level 2-1 to Level 2-n to the elasticity-adjusting unit so that the elastic modulus of the elasticity-adjusting unit is changed to a respective elastic modulus corresponding to Level 2-1 to Level 2-n.

In an embodiment, the elasticity-adjusting circuit detects a panel temperature of the display panel in the third control mode, and supplies a control signal of one of Level 3-1 to Level 3-n to a power supply connected to the at least one elasticity-adjusting unit based on results of sequentially comparing the panel temperature with predetermined first to $n^{th}$ panel temperature values. n is a natural number greater than or equal to 2. The power supply supplies a driving voltage corresponding to one of Level 3-1 to Level 3-n to the elasticity-adjusting unit so that the elastic modulus of the elasticity-adjusting unit is changed to a respective elastic modulus corresponding to Level 3-1 to Level 3-n.

In an embodiment, the elasticity-adjusting circuit sequentially compares touch coordinates of the electronic pen with predetermined first to $n^{th}$ area coordinate data in the fourth control mode, and supplies a control signal of one of Level 4-1 to Level 4-n to a power supply connected to the at least one elasticity-adjusting unit based on results of the sequential comparing. n is a natural number greater than or equal to 2. The power supply supplies a driving voltage corresponding to one of Level 4-1 to Level 4-n to the elasticity-adjusting unit so that the elastic modulus of the elasticity-adjusting unit is changed to a respective elastic modulus corresponding to Level 4-1 to Level 4-n.

According to embodiments of the present disclosure, the elastic force of folding areas of a display device in a touch input system can be adjusted in response to changes of the usage state and the usage environment such as a folding mode, a flex mode, a flat mode and an electronic pen usage mode, so that the robustness of the folding areas can be increased and winkles can be prevented.

In addition, according to embodiments of the present disclosure, the elastic force of the folding areas of the display device in the touch input system can be changed according to the touch location of a finger or a touch input device, so that the durability of the folding areas can be increased and the user's reliability and satisfaction can be increased.

It should be noted that effects of embodiments of the present disclosure are not limited to those described above and other effects of embodiments of the present disclosure will be apparent to those skilled in the art from the following descriptions.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF EMBODIMENTS

The present invention will now be described more fully hereinafter with reference to the accompanying drawings, in which embodiments of the present disclosure are shown. The present disclosure may, however, be embodied in different forms and should not be construed as limited to the embodiments set forth herein.

It will also be understood that when a layer is referred to as being "on" another layer or substrate, it can be directly on the other layer or substrate, or intervening layers may also be present. When a layer is referred to as being "directly on" another layer or substrate, no intervening layers may be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Each of the features of various embodiments of the present disclosure may be combined or combined with each other, in part or in whole, and technically various interlocking and driving are possible. Each embodiment may be implemented independently of each other or may be implemented together in an association.

Hereinafter, embodiments of the present disclosure will be described with reference to the accompanying drawings.

Figure 1:
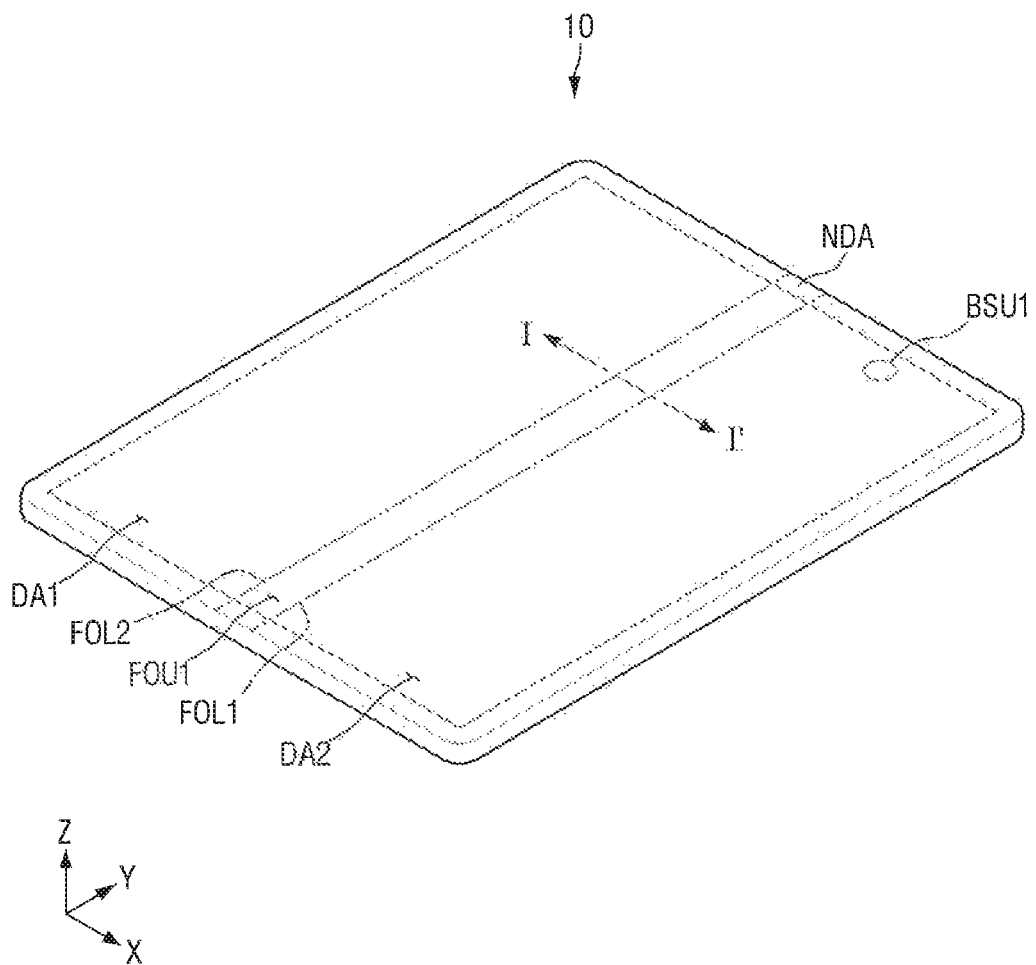
FIG. 1 is a perspective view showing a display device according to an embodiment of the present disclosure.
Figure 2:
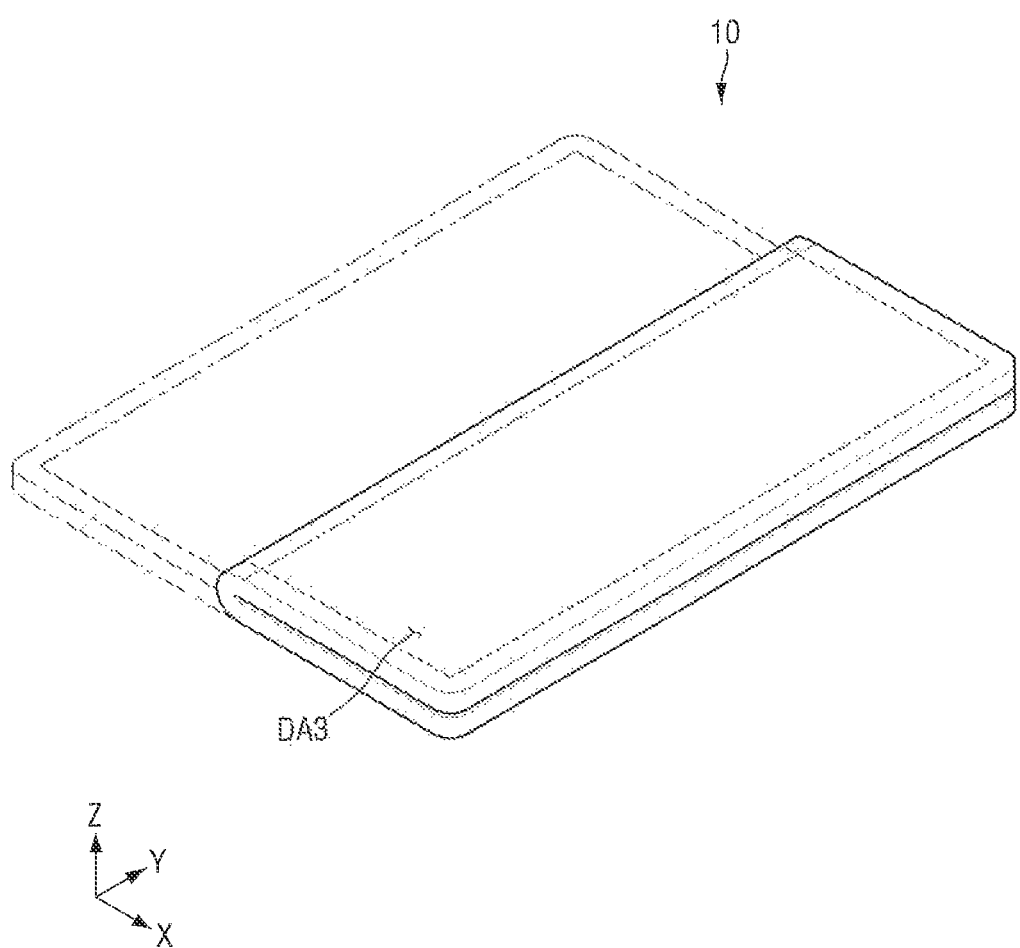
FIG. 2 is a perspective view showing the display device in a folded state according to an embodiment of the present disclosure.

FIG. 1 is a perspective view showing a display device according to an embodiment of the present disclosure. FIG. 2 is a perspective view showing the display device according to the embodiment of the present disclosure when it is folded.

Referring to FIGS. 1 and 2, a display device 10 according to an embodiment of the present disclosure is a foldable display device and may be applied to portable electronic devices such as a mobile phone, a smart phone, a tablet PC, a mobile communications terminal, an electronic notebook, an electronic book, a portable multimedia player (PMP), a navigation device and a ultra mobile PC (UMPC). Alternatively, the display device 10 according to an embodiment of the present disclosure may be used as a display unit of a television, a laptop computer, a monitor, an electronic billboard, or the Internet of Things (IOT). However, embodiments of the present disclosure are not necessarily limited thereto.

As used herein, the first direction (x-axis direction) may be the shorter side direction of the display device 10 when it is folded, for example, the horizontal direction of the display device 10. The second direction (y-axis direction) may be the longer side direction of the display device 10 when it is folded, for example, the vertical direction of the display device 10. A third direction (z-axis direction) may refer to the thickness direction of the display device 10.

In the embodiment shown in FIGS. 1 and 2, the display device 10 is a foldable display device that can be folded once in the first direction (x-axis direction). The display device 10 may be switched between a folding shape in which it is fully folded, a flexion shape in which it is folded or bent at a predetermined angle, and a flat shape in which it is fully unfolded, or may be held in one of the states. The display device 10 may be folded inward such that the front surface where images are displayed is located inside (e.g., an in-folding manner). In an embodiment in which the display device 10 is bent or folded in the in-folding manner, one portion of the front surface of the display device 10 may face another portion of the front surface. Alternatively, the display device 10 may be folded outward such that the front surface where images are displayed is located outside (e.g., an out-folding manner). When the display device 10 is bent or folded in the out-folding manner, one portion of the rear surface of the display device 10 may face the other portion of the rear surface.

An image display area of the display device 10 may be divided into a plurality of non-folding areas DA1 to DA3 and a first folding area FOU1. For example, the first folding area FOU1 may be disposed between the first and second non-folding areas DA1 and DA2. In addition, the third non-folding area DA3 may be disposed on the rear surface of the first non-folding area DA1. In an embodiment, a non-display area NDA may be formed at the border of the entire image display area, such as the borders of the plurality of non-folding areas DA1 to DA3 and the first folding area FOU1. However, embodiments of the present disclosure are not necessarily limited thereto and in some embodiments, at least one of the plurality of non-folding areas DA1 to DA3 may extend to an edge of the display device 10 and the non-display area NDA may not be formed at such edge.

The first folding area FOU1 may be located between the first and second non-folding areas DA1 and DA2 (e.g., in the x-axis direction) and extended in the second direction (y-axis direction), and may be folded inward or outward in the first direction DR1 (x-axis direction). For example, the first non-folding area DA1 may be located on one side, for example, on the left side of the first folding area FOU1. The second non-folding area DA2 may be located on the opposite side, for example, on the right side of the first folding area FOU1. The first folding area FOU1 and first and second folding lines FOL1 and FOL2 may be extended in the second direction (y-axis direction), and the display device 10 may be folded in the first direction (x-axis direction).

When the first folding area FOU1 is folded outward, the rear surfaces of the first and second non-folding areas DA1 and DA2 may face each other. When the first folding area FOU1 is folded inward, the front surfaces of the first and second non-folding areas DA1 and DA2 may face each other. As such, when the first folding area FOU1 is extended in the second direction (y-axis direction) and is folded inward or outward in the first direction (x-axis direction), the width of the display device 10 in the first direction (x-axis direction) may be reduced to approximately half.

When the first folding area FOU1 and the first and second folding lines FOL1 and FOL2 are disposed in the first direction (x-axis direction) so that they are extended in the second direction (y-axis direction), the width of the first folding area FOU1 in the first direction (x-axis direction) may be less than the length in the second direction (y-axis direction). In addition, the width of the first non-folding area DA1 in the first direction (x-axis direction) may be greater than the width of the first folding area FOU1 in the first direction (x-axis direction). The width of the second non-folding area DA2 in the first direction (x-axis direction) may also be formed to be greater than the width of the first folding area FOU1 in the first direction (x-axis direction).

The image display area of the display device 10 on the front side may overlap the first non-folding area DA1, the first folding area FOU1 and the second non-folding area DA2. Therefore, when the display device 10 is unfolded as shown in FIG. 1, images may be displayed on the front side in the folding area FDA, the first non-folding area NFA1 and the second non-folding area NFA2 of the display device 10. On the other hand, as shown in FIG. 2, when the first folding area FOU1 is folded inward, only the third non-folding area DA3 may be located on the front side. At this time, images may be displayed on the front side only in the third non-folding area DA3.

In the first folding area FOU1, an elasticity-adjusting unit is included that is capable of adjusting elasticity and thickness change in the third direction (z-axis direction) that is the thickness direction of the first folding area FOU1. In an embodiment, the elasticity-adjusting unit of the first folding area FOU1 may be formed to have a width substantially equal to the width of the first folding area FOU1. The elasticity of the elasticity-adjusting unit may be changed in response to a change in the folding state of the first folding area FOU1. The shapes of the first folding area FOU1 in different folding states may include a folding shape (e.g., the shape of the first folding area FOU1 when the display device 10 is in a fully folded state), a flexion shape in a flex mode (e.g., the shape of the first folding area FOU1 when the display device 10 is between a fully folded state and a fully unfolded state) and the flat shape of the first folding area FOU1 (e.g., the shape of the first folding area FOU1 when the display device 10 is in a fully unfolded state), so that the elasticity and the thickness of the first folding area FOU1 may be partially changed. Hereinafter, a specific structure of the elasticity-adjusting unit and a technique of changing the elasticity will be described in more detail with reference to the accompanying drawings.

Figure 3:
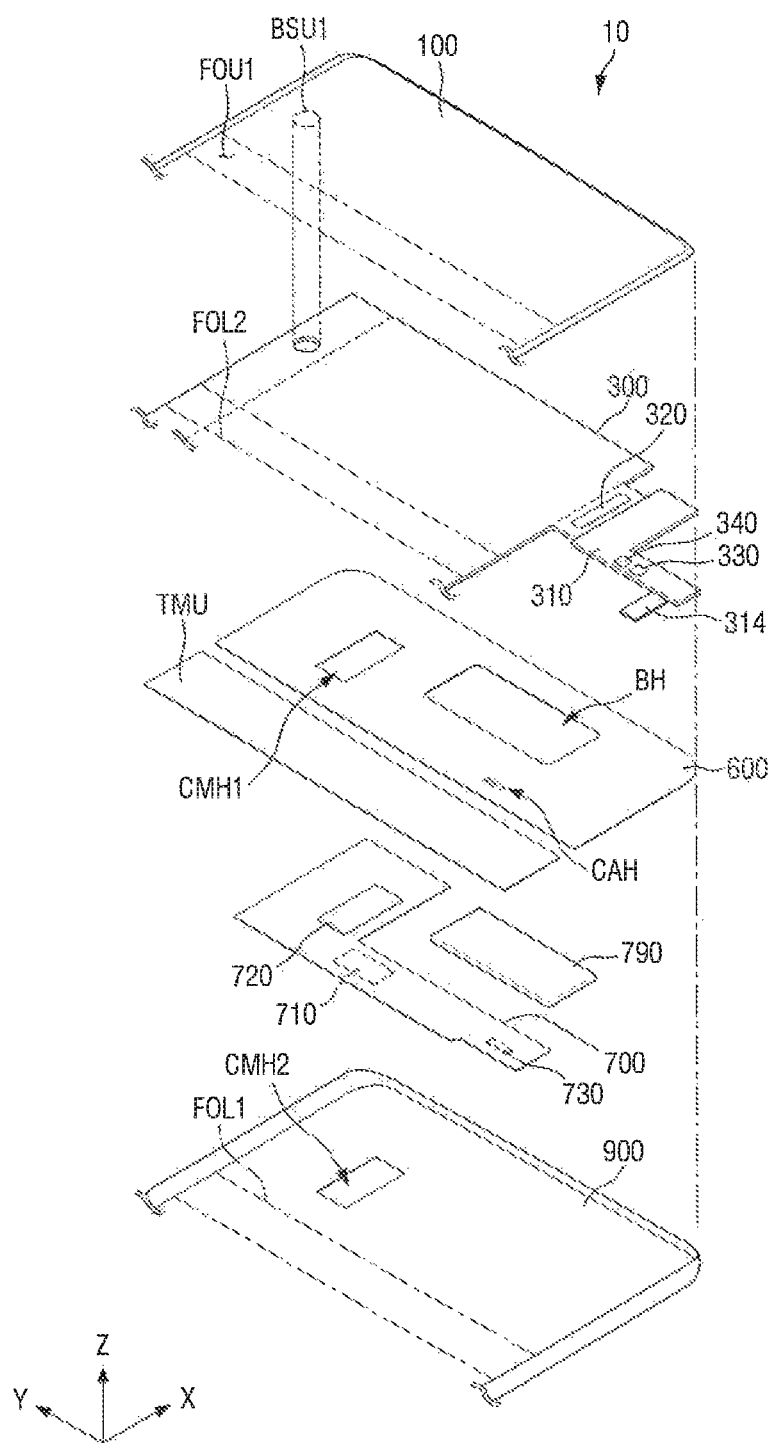
FIG. 3 is an exploded perspective view showing a structure of a part that corresponds to a first folding area and a second non-folding area of the entire image display area of the display device according to an embodiment of the present disclosure.

FIG. 3 is an exploded perspective view showing a structure of a part that corresponds to a first folding area and a second non-folding area of the entire image display area of the display device.

Although FIG. 3 shows only the structure of the part of the display device that corresponds to the first folding area FOU1 and the second non-folding area DA2, the structure of the first and second non-folding areas DA1 and DA2 and the first folding area FOU1 is not limited to the structure of FIG. 3. For example, the display device 10 may further include or share different structures.

Referring to the structure of the part corresponding to the first folding area FOU1 and the second non-folding area DA2, the display device 10 includes a cover window 100, a display panel 300, a display circuit board 310, a display driver circuit 320, an elasticity-adjusting unit TMU, a bracket 600, a main circuit board 700, and a bottom cover 900. The elasticity-adjusting unit TMU changes an elastic force (e.g., an elasticity) of the first folding area FOU1.

The display panel 300 may be disposed under or on the rear surface of the cover window 100. Pixels for displaying images may be formed in the image display area of the display panel 300, and the non-display area may be formed around the image display area where no pixel is formed. The non-display area may be disposed to surround the image display area (e.g., in the x-axis and y-axis directions), and the image display area may occupy most of the area of the display panel 300.

The display panel 300 may be a light-emitting display panel including light-emitting elements. For example, the display panel 300 may be an organic light-emitting display panel using organic light-emitting diodes including organic emissive layer, a micro light-emitting diode display panel using micro LEDs, a quantum-dot light-emitting display panel including quantum-dot light-emitting diodes including an quantum-dot emissive layer, or an inorganic light-emitting display panel using inorganic light-emitting elements including an inorganic semiconductor. In the following description, an organic light-emitting display panel is employed as the display panel 300 for convenience of explanation.

In addition, the display panel 300 may include a touch electrode layer having touch electrodes for sensing an object such as a person's finger or a pen. The touch electrode layer may be disposed on a display layer in which pixels displaying images are disposed. The display layer and the touch electrode layer will be described in detail later with reference to the accompanying drawings.

The display panel 300 may include at least one sensor area BSU1. For example, the sensor area BSU1 may be surrounded by the image display area. Alternatively, the sensor area BSU1 may be surrounded by the non-display area or may be disposed between the image display area and the non-display area. Although at least one sensor area BSU1 is disposed in the upper center of the display panel 300 in the example shown in FIGS. 1 and 3, the location of the sensor area BSU1 is not necessarily limited thereto. The sensor area BSU1 may include a light-receiving sensor sensing light incident on the front side, an outside temperature sensor sensing a temperature outside the sensor area BSU1, and an inside temperature sensor sensing a temperature inside the sensor area BSU1 (or the temperature of the display panel 300).

The display circuit board 310 and the display driver circuit 320 may be attached to one side of the display panel 300. The display circuit board 310 may be a flexible printed circuit board that can be bent, a rigid printed circuit board that is rigid and not bendable, or a hybrid printed circuit board including a rigid printed circuit board and a flexible printed circuit board.

The display driver circuit 320 may receive control signals and supply voltages through the display circuit board 310 and may generate and output signals and voltages for driving the display panel 300. In an embodiment, the display driver circuit 320 may be implemented as an integrated circuit (IC) and may be attached to the display panel 300 by a chip on glass (COG) technique, a chip on plastic (COP) technique, or an ultrasonic bonding. It is, however, to be understood that embodiments of the present disclosure are not necessarily limited thereto. For example, the display driver circuit 320 may be attached on the display circuit board 310.

A touch driver circuit 330 and an elasticity-adjusting circuit 340 may be disposed on the display circuit board 310. Each of the touch driver circuit 330 and the elasticity-adjusting circuit 340 may be implemented as an integrated circuit and may be attached to the upper surface of the display circuit board 310. Alternatively, the touch driver circuit 330, the elasticity-adjusting circuit 340 and the display driver circuit 320 may be implemented as a single integrated circuit in some implementations.

The touch driver circuit 330 may be electrically connected to touch electrodes of the touch electrode layer of the display panel 300 through the display circuit board 310. The touch driver circuit 330 may output touch driving signals to the touch electrodes and may sense a voltage charged in capacitance of the touch electrodes.

The touch driver circuit 330 may generate touch data based on a change in the electric signal sensed by each of the touch electrodes to transmit it to the main processor 710, and the main processor 710 may analyze the touch data to calculate the coordinates of the position where the touch input is made. Touches may include a physical contact and a near proximity. A physical contact refers to an object such as the user's finger or a pen that is brought into contact with the cover window 100 disposed on the touch electrode layer. A near proximity refers to an object such as a person's finger or an electronic pen that is close to but is spaced apart from the cover window 100, such as hovering over it.

On the display circuit board 310, power supplies for applying display driving voltages for driving the display driver circuit 320 and elasticity-adjusting voltages for adjusting the elasticity of the elasticity-adjusting unit TMU may be further disposed. In addition, a Hall sensor for detecting a folding angle of the first folding area FOU1 may be further included on the display circuit board 310.

The elasticity-adjusting circuit 340 adjusts different levels of the elasticity of the elasticity-adjusting unit TMU which are associated with the folding shape, the flexion shape and the flat shape of the first folding area FOU1, respectively. In addition, the elasticity-adjusting circuit 340 may adjust the elasticity of the elasticity-adjusting unit TMU to different levels which are associated with changes of the outside temperature, the folding angle in the flexion shape, and the inside temperature. For example, when the first folding area FOU1 is folded, the elasticity-adjusting circuit 340 senses a temperature outside the sensor area BSU1 through the outside temperature sensor, and adjusts the elasticity of the elasticity-adjusting unit TMU to a level associated with a change in the outside temperature. In doing so, the elasticity-adjusting circuit 340 supplies an elasticity control signal corresponding to one of Level 1-1 to Level 1-n in response to changes in the outside temperature to a power supply, so that the driving voltage corresponding to one of Level 1-1 to Level 1-n is supplied to the elasticity-adjusting unit TMU. As a result, in the fully folding state, the elastic force of the elasticity-adjusting unit TMU is changed in response to the driving voltage corresponding to one of Level 1-1 to Level 1-n, where n may be a natural number greater than or equal to two.

The elasticity-adjusting circuit 340 senses the flexion angle of the first folding area FOU1 through the Hall sensor when the first folding area FOU1 is flexed, and adjusts the elasticity of the elasticity-adjusting unit TMU to different levels associated with the changes in the flexion angle. In doing so, the elasticity-adjusting circuit 340 supplies an elasticity control signal of one of Level 1-1 to Level 2-n depending on the change in the flexion angle of the first folding area FOU1 to the power supply, so that the driving voltage corresponding to one of Level 2-1 to Level 2-n is applied to the elasticity-adjusting unit TMU. As a result, in the flexion shape, the elastic force of the elasticity-adjusting unit TMU is changed in response to the driving voltage corresponding to one of Level 2-1 to Level 2-n. When the first folding area FOU1 is flat, the elasticity-adjusting circuit 340 senses a temperature of the display panel 300 through the inside temperature sensor, and adjusts the elasticity of the elasticity-adjusting unit TMU to different levels associated with changes in the temperature of the display panel 300. In doing so, the elasticity-adjusting circuit 340 supplies an elasticity control signal corresponding to one of Level 3-1 to Level 3-n depending on the change in the temperature of the display panel 300 to the power supply, so that the driving voltage corresponding to one of Level 3-1 to Level 3-n is applied to the elasticity-adjusting unit TMU. As a result, in the fully flat shape, the elastic force of the elasticity-adjusting unit TMU is changed in response to the driving voltage corresponding to one of Level 3-1 to Level 3-n.

When the first folding area FOU1 is flat, the elasticity-adjusting circuit 340 receives touch coordinates from the main processor 710 or the touch driver circuit 330 to determine the location at which the user's electronic pen is touched. The elasticity-adjusting circuit 340 adjusts the elasticity of the elasticity-adjusting unit TMU to different levels associated with the locations at which the electronic pen is touched. In doing so, the elasticity-adjusting circuit 340 supplies an elasticity control signal corresponding to one of Level 4-1 to Level 4-n depending on the locations of the display panel 300 at which the electronic pen is touched to the power supply, so that the driving voltage corresponding to one of Level 4-1 to Level 4-n is applied to the elasticity-adjusting unit TMU. As a result, in the fully flat shape, the elastic force of the elasticity-adjusting unit TMU is changed in response to the driving voltage corresponding to one of Level 4-1 to Level 4-n.

The elastic force (e.g., an elastic modulus) of the elasticity-adjusting unit TMU is changed in response to the magnitude of each of the driving voltages corresponding to Level 1-1 to Level 1-n, Level 2-1 to Level 2-n, Level 3-1 to Level 3-n, and Level 4-1 Level 4-n, respectively. In an embodiment, the magnitudes of the driving voltages corresponding to the Level 2-1 to Level 2-n may be larger than the magnitudes of the driving voltages corresponding to Level 1-1 to Level 1-n, respectively. In addition, the magnitudes of the driving voltages corresponding to Level 3-1 to Level 3-n may be larger than the magnitudes of the driving voltages corresponding to Level 2-1 to Level 2-n, respectively. The magnitudes of the driving voltages corresponding to Level 4-1 to Level 4-n may be larger than the magnitudes of the driving voltages corresponding to Level 3-1 to Level 3-n, respectively.

The elasticity-adjusting unit TMU may be disposed on the rear surface of the first folding area FOU1 and may have a width equal to the width of the first folding area FOU1. The elastic force and thickness of the elasticity-adjusting unit TMU are partially changed in response to the magnitude of each of the driving voltages corresponding to the different levels input from the power supply. The elastic force of the elasticity-adjusting unit TMU may be increased to higher levels as the driving voltages corresponding to higher levels are input.

At least one bracket 600 may be disposed on the rear surface of the display panel 300 in each of the first and second non-folding areas DA1 and DA2. The elasticity-adjusting unit TMU disposed on the rear surface of the first folding area FOU1 may be disposed between the brackets 600 disposed on the rear surfaces of the first and second non-folding areas DA1 and DA2, respectively. In an embodiment, the bracket 600 may include plastic, metal, or both plastic and metal. In the bracket 600, a first camera hole CMH1 in which a first camera sensor 720 is inserted, a battery hole BH in which a battery is disposed, a cable hole CAH through which a cable 314 connected to the display circuit board 310 passes, etc. may be formed. The main circuit board 700 and a battery 790 may be disposed under the bracket 600. The main circuit board 700 may be either a printed circuit board or a flexible printed circuit board.

The main circuit board 700 may include a main processor 710, a first camera sensor 720, and a main connector 730. The first camera sensor 720 may be disposed on both the upper and lower surfaces of the main circuit board 700, the main processor 710 may be disposed on the upper surface of the main circuit board 700, and the main connector 730 may be disposed on the lower surface of the main circuit board 700.

The main processor 710 may control all the functions of the display device 10. For example, in an embodiment the main processor 710 may output digital video data to the display driver circuit 320 through the display circuit board 310 so that the display panel 300 displays images. In addition, the main processor 710 may receive touch data from the touch driver circuit 330 to determine the coordinates of the user's touch, and then may execute an application indicated by the icon displayed at the coordinates of the user's touch. In addition, the main processor 710 may convert the first image data input from the first camera sensor 720 into digital video data and may output the digital video data to the display driver circuit 320 through the display circuit board 310, so that the image captured by the first camera sensor 720 may be displayed on the display panel 300. The cable 314 having passed through the cable hole CAH of the bracket 60 may be connected to main connector 730. Accordingly, the main circuit board 700 may be electrically connected to the display circuit board 310.

The battery 790 may be disposed so that it does not overlap the main circuit board 700 in the third direction (z-axis direction). The battery 790 may overlap with the battery hole BH of the bracket 600.

Besides, a mobile communications module capable of transmitting/receiving a radio signal to/from at least one of a base station, an external terminal and a server over a mobile communications network may be further mounted on the main circuit board 700. The wireless signal may include various types of data depending on a voice signal, a video call signal, or a text/multimedia message transmission/reception.

The bottom cover 900 may be disposed under the main circuit board 700 and the battery 790. The bottom cover 900 may be fastened and fixed to the bracket 600. The bottom cover 900 may form the exterior of the lower surface of the display device 10. In an embodiment, the bottom cover 900 may include plastic, metal or plastic and metal.

A second camera hole CMH2 may be formed in the bottom cover 900, via which the lower surface of the first camera sensor 720 is exposed. The position of the first camera sensor 720 and the positions of the first and second camera holes CMH1 and CMH2 in line with the first camera sensor 720 are not necessarily limited to those according to the embodiment shown in FIG. 2.

Figure 4:
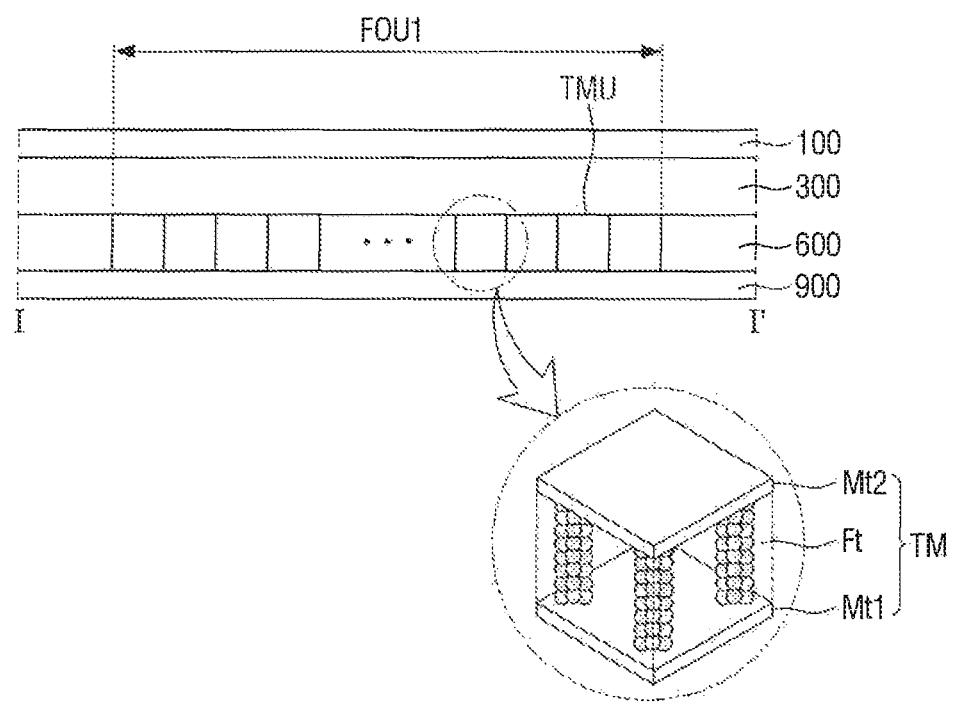
FIG. 4 is a cross-sectional view schematically showing the structure of the first folding area and an elasticity-adjusting module, taken along line I-I of FIG. 1 according to an embodiment of the present disclosure.

FIG. 4 is a cross-sectional view schematically showing the structure of the first folding area and an elasticity-adjusting module, taken along line I-I of FIG. 1.

Referring to FIG. 4, the brackets 600 may be disposed on the rear surfaces of the first and second non-folding areas DA1 and DA2 of the display panel 300, respectively, and the width of the elasticity-adjusting unit TMU disposed on the first folding area FOU1 may be substantially equal to the width of the first folding area FOU1. Accordingly, the elasticity-adjusting unit TMU may be disposed between the brackets 600 when viewed from the top.

The elasticity-adjusting unit TMU includes at least one elasticity-adjusting member TM. In an embodiment in which the elasticity-adjusting unit TMU includes one elasticity-adjusting member TM, the one elasticity-adjusting member TM has the same width as the first folding area FOU1 when viewed from the top and may be disposed on the rear surface of the first folding area FOU1. Alternatively, in an embodiment in which the elasticity-adjusting unit TMU includes a plurality of elasticity-adjusting members TM, the plurality of elasticity-adjusting members TM may be arranged on the rear surface of the first folding area FOU1 in an N×M arrangement when viewed from the top. The elasticity-adjusting members TM of the N×M arrangement may also be disposed on the rear surface of the first folding area FOU1 with the same planar area as the first folding area FOU1, where N and M may be natural numbers and may be different from each other.

Each of the elasticity-adjusting members TM includes a first planar electrode Mt1, and a second planar electrode Mt2 disposed in parallel to the first planar electrode Mt1 with an elastic member Ft having a variable elastic modulus interposed therebetween. In an embodiment, the first and second planar electrodes Mt1 and Mt2 may be formed as a flexible electrode (metal nanowire, CNT, PEDOT, graphene) including at least one metal composed of aluminum, silver, copper and iron, and an alloy thereof. In addition, the elastic member Ft having a variable elastic modulus may include at least one of a magneto-rheological fluid (MR) module and an electro-rheological fluid (ER) module. The arrangement structure of metal particles in the MR and ER modules used as the elastic member Ft is changed by the voltage difference between two electrodes, and thus the elastic modulus is changed according to the change in the arrangement structure of the metal particles.

In an embodiment, a predetermined low-level voltage or ground voltage may be applied to the planar electrode Mt1, while a driving voltage corresponding to one of the different levels may be applied to the second planar electrode Mt2 from the power supply. Accordingly, the elastic modulus of the elastic member Ft may vary depending on a voltage difference between the first planar electrode Mt1 and the second planar electrode Mt2. As the voltage difference between the first and second planar electrodes Mt1 and Mt2 increases, the elastic modulus of the elastic member Ft increases. As the voltage differences between the first and second planar electrodes Mt1 and Mt2 decreases, the elastic modulus of the elastic member Ft decreases.

Referring to FIG. 4, as the difference voltage between the first and second planar electrodes Mt1 and Mt2 increases, the elastic modulus of the elastic member Ft may increase. For example, when the first folding area FOU1 is fully flat (e.g., in an unfolded state), the elasticity-adjusting circuit 340 may supply an elasticity control signal of one of Level 3-1 to Level 3-n depending on the inside temperature change sensed through the inside temperature sensor. Accordingly, the power supply supplies a driving voltage corresponding to one of Level 3-1 to Level 3-n to the elasticity-adjusting unit TMU, so that the elastic modulus of the elasticity-adjusting unit TMU is adjusted up to one of Level 3-1 to Level 3-n.

In an embodiment, when the first folding area FOU1 is fully flat, the elasticity-adjusting circuit 340 may receive touch coordinates from the touch driver circuit 330, and may supply an elasticity control signal of one of Level 4-1 to Level 4-n to the power supply depending on the touch coordinates. Accordingly, the power supply supplies a driving voltage corresponding to one of Level 4-1 to Level 4-n to the elasticity-adjusting unit TMU, so that the elastic modulus of the elasticity-adjusting unit TMU is adjusted up to one of Level 4-1 to Level 4-n.

Figure 5:
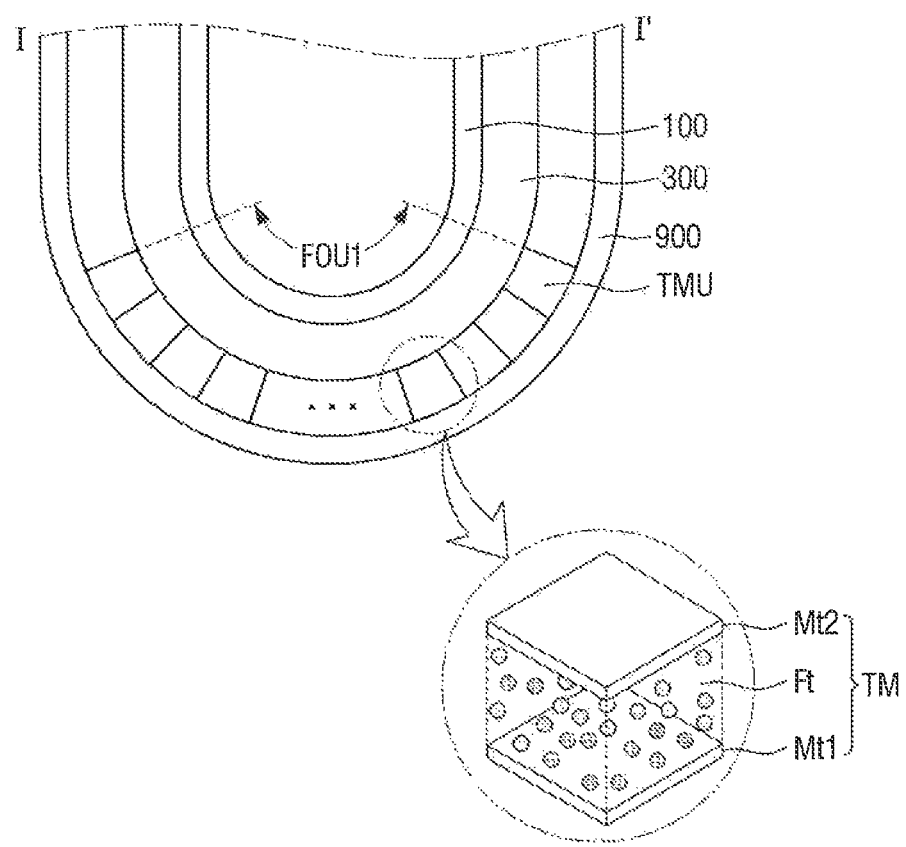
FIG. 5 is a cross-sectional view showing the first folding area and the elasticity-adjusting module shown in FIG. 4 in a folded state according to an embodiment of the present disclosure.

FIG. 5 is a cross-sectional view showing the first folding area and the elasticity-adjusting module shown in FIG. 4 when they are folded.

Referring to FIG. 5, the elasticity-adjusting unit TMU may include a plurality of elasticity-adjusting members TM. The plurality of elasticity-adjusting members TM may be arranged on the rear surface of the first folding area FOU1 in an N×M arrangement when viewed from the top.

The elastic modulus of the elastic member Ft included in each of the elasticity-adjusting members TM may be lowered depending on a voltage difference between the first planar electrode Mt1 and the second planar electrode Mt2. For example, as the difference in voltage between the first and second planar electrodes Mt1 and Mt2 decreases, the elastic modulus of the elastic member Ft may be lowered.

For example, when the first folding area FOU1 is fully folded (e.g., is in a folded state), the elasticity-adjusting circuit 340 may sense a change in outside or inside temperature, and may supply an elasticity control signal of one of Level 1-1 to Level 1-n to the power supply based on the sensed temperature. Accordingly, the power supply supplies a driving voltage corresponding to one of Level 1-1 to Level 1-n to the elasticity-adjusting unit TMU, so that the elastic modulus of the elasticity-adjusting unit TMU is adjusted down to one of Level 1-1 to Level 1-n.

Figure 6:
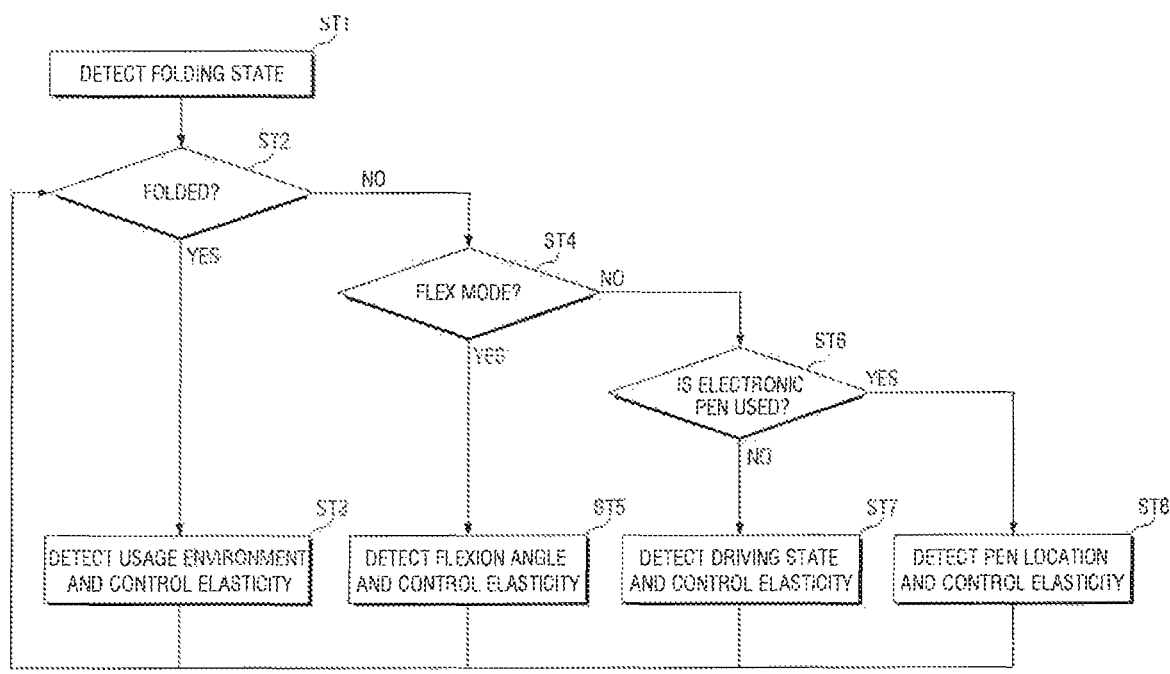
FIG. 6 is a flowchart for illustrating a process of adjusting an elastic force by the main processor and the elasticity-adjusting module shown in FIG. 3 according to an embodiment of the present disclosure.

FIG. 6 is a flowchart for illustrating a process of adjusting an elastic force by the main processor and the elasticity-adjusting module shown in FIG. 3.

Referring to FIG. 6, the elasticity-adjusting circuit 340 detects a usage form of the display device 10 through at least one temperature sensor and Hall sensor, and adjusts the elastic modulus for the elasticity-adjusting unit TMU of the first folding area FOU1 to a level appropriate for the usage form of the display device 10. For example, in an embodiment the elasticity-adjusting circuit 340 may detect a change of the shape of the first folding area FOU1 and determine the changed shape of the first folding area FOU1 is one of the folding shape, the flexion shape and the flat shape, and may adjust the elastic modulus of the elasticity-adjusting unit TMU to a level associated with the changed shape of the first folding area FOU1.

For example, the elasticity-adjusting circuit 340 detects the folding state of the first folding area FOU1 using at least one Hall sensor in step ST1. The elasticity-adjusting circuit 340 adjusts the elastic modulus of the elasticity-adjusting unit TMU to a level appropriate for the surrounding usage environment (e.g., outside temperature) as the first folding area FOU1 is folded in step ST2. For example, when it is detected that the first folding area FOU1 is folded in the folding shape by at least one Hall sensor, the elasticity-adjusting circuit 340 may determine that the display device 10 is not being used but is held or stored as it is folded in Step ST2. The elasticity-adjusting circuit 340 may adjust the elasticity of the elasticity-adjusting unit TMU to a lower level so that the folded first folding area FOU1 is not pressed too much. To this end, the elasticity-adjusting circuit 340 may adjust the elasticity of the elasticity-adjusting unit TMU to lower levels in accordance with changes in the surrounding usage environment, such as outside temperature in step ST3.

In an embodiment, the elasticity-adjusting circuit 340 may detect the flexion shape of the first folding area FOU1 through at least one Hall sensor, and may adjust the elastic modulus of the elasticity-adjusting unit TMU to different levels associated with changes in the flexion angle of the first folding area FOU1. For example, when it is detected that the first folding area FOU1 is flexed in a flexion shape by at least one Hall sensor, the elasticity-adjusting circuit 340 may determine that the user is using the display device 10 in a flex mode in step ST4. Accordingly, the elasticity-adjusting circuit 340 may detect a change in the flexion angle of the first folding area FOU1, and may adjust the elastic modulus of the elasticity-adjusting unit TMU to different levels associated with changes in the flexion angle of the first folding area FOU1 so that the first folding area FOU1 is not pressed too much in step ST5.

In an embodiment, the elasticity-adjusting circuit 340 detects if there is a change in the flat shape of the first folding area FOU1 and if an electronic pen is being used in the flat shape in step ST6. When the elasticity-adjusting circuit 340 determines that the first folding area FOU1 is in the flat shape and is not in a folding shape or flexion shape in flex mode, the elasticity-adjusting circuit 340 detects if an electronic pen is being used. When no electronic pen is detected as being used, the elasticity of the elasticity-adjusting unit TMU may be adjusted to different levels associated with temperature changes of the display panel 300 in step ST7. For example, the elasticity-adjusting circuit 340 detects a change in the flat shape of the first folding area FOU1 through at least one Hall sensor, and may detect if the electronic pen is being used in the flat shape based on whether touch coordinates are input by the touch driver circuit 330. Accordingly, the elasticity-adjusting circuit 340 may determine a situation in which the user is not using the electronic pen as an input device and the user is only using a body part, such as a finger, as an input when the display device 10 is in the flat shape. If the electronic pen is detected as not being used, the elasticity-adjusting circuit 340 may sense a temperature change of the display panel 300 and may flexibly adjust the elasticity of the elasticity-adjusting unit TMU so that no wrinkle is formed in the first folding area FOU1 in accordance with the temperature change of the display panel 300 in step ST7.

In an embodiment, the elasticity-adjusting circuit 340 may determine the location at which the electronic pen is touched if the electronic pen is detected as being used in the flat shape, and may adjust the elasticity of the elasticity-adjusting unit TMU to the different levels according to the changes in the location of the electronic pen on the display panel 300 in step ST8.

For example, the elasticity-adjusting circuit 340 detects a change in the flat shape of the first folding area FOU1 through at least one Hall sensor, and may detect if the electronic pen is being used in the flat shape (e.g., a fully unfolded state) based on whether touch coordinates are input by the touch driver circuit 330. When an electronic pen is used, the elasticity-adjusting circuit 340 may identify touch coordinates of the electronic pen in real time to flexibly adjust the elasticity of the elasticity-adjusting unit TMU so that the first folding area FOU1 is changed more robustly according to changes in the touch coordinates of the electronic pen relative to the location of the first folding region FOU1 in step ST8.

Figure 7:
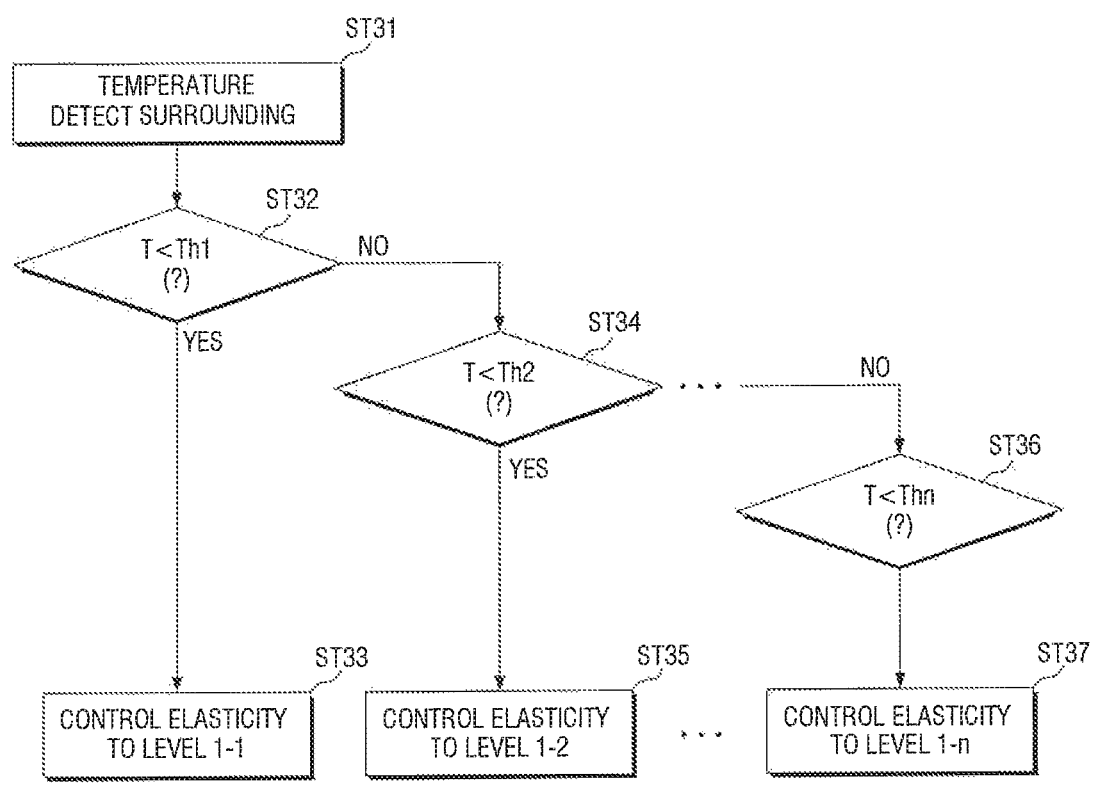
FIG. 7 is a flowchart for illustrating a process of adjusting an elastic force in response to the detection of the usage environment of FIG. 6 according to an embodiment of the present disclosure.

FIG. 7 is a flowchart for illustrating a process of adjusting an elastic force in response to the detection of the usage environment of FIG. 6.

Referring to FIG. 7, the elasticity-adjusting circuit 340 adjusts the elasticity of the elasticity-adjusting unit TMU in response to an outside temperature change as it is determined that the first folding area FOU1 is in the folding shape by at least one Hall sensor.

In an embodiment, if it is determined that the first folding area FOU1 is fully folded in the folding shape, the elasticity-adjusting circuit 340 senses a temperature around the sensor area BSU1 through the outside temperature sensor in step ST31. Subsequently, the elasticity-adjusting circuit 340 sequentially compares the outside temperature value T detected through the outside temperature sensor with predetermined first to $n^{th}$ reference temperature values Th1 to Thn in steps ST32, ST34 and ST36.

For example, the elasticity-adjusting circuit 340 may first compare the outside temperature value T with a predetermined first reference temperature value Th1, and if the outside temperature value T is less than the first reference temperature value Th1, the elasticity-adjusting circuit 340 may supply the elastic control signal corresponding to Level 1-1 to the power supply in step T33. Alternatively, if the outside temperature value T is greater than or equal to the first reference temperature value Th1, the outside temperature value T is compared with a second reference temperature value Th2 that is greater than the first reference temperature value Th1. If the outside temperature value T is less than the second reference temperature value Th2, the elastic control signal of Level 1-2 may be supplied to the power supply in step T35. If the outside temperature value T is greater than or equal to the second reference temperature value Th2, the outside temperature value T is compared with the $n^{th}$ reference temperature value Thn that is greater than the second reference temperature value Th2 and the elasticity-adjusting circuit 340 may supply the elastic control signal of Level 1-n to the power supply in step S37.

As such, the elasticity-adjusting circuit 340 may supply an elastic control signal of one of Level 1-1 to Level 1-n based on the results obtained by sequentially comparing the outside temperature value T with the first to $n^{th}$ reference temperature values Th1 to Thn. Accordingly, the power supply supplies a driving voltage corresponding to one of Level 1-1 to Level 1-n to the elasticity-adjusting unit TMU, so that the elastic modulus of the elasticity-adjusting unit TMU is adjusted to one of Level 1-1 to Level 1-n.

Figure 8:
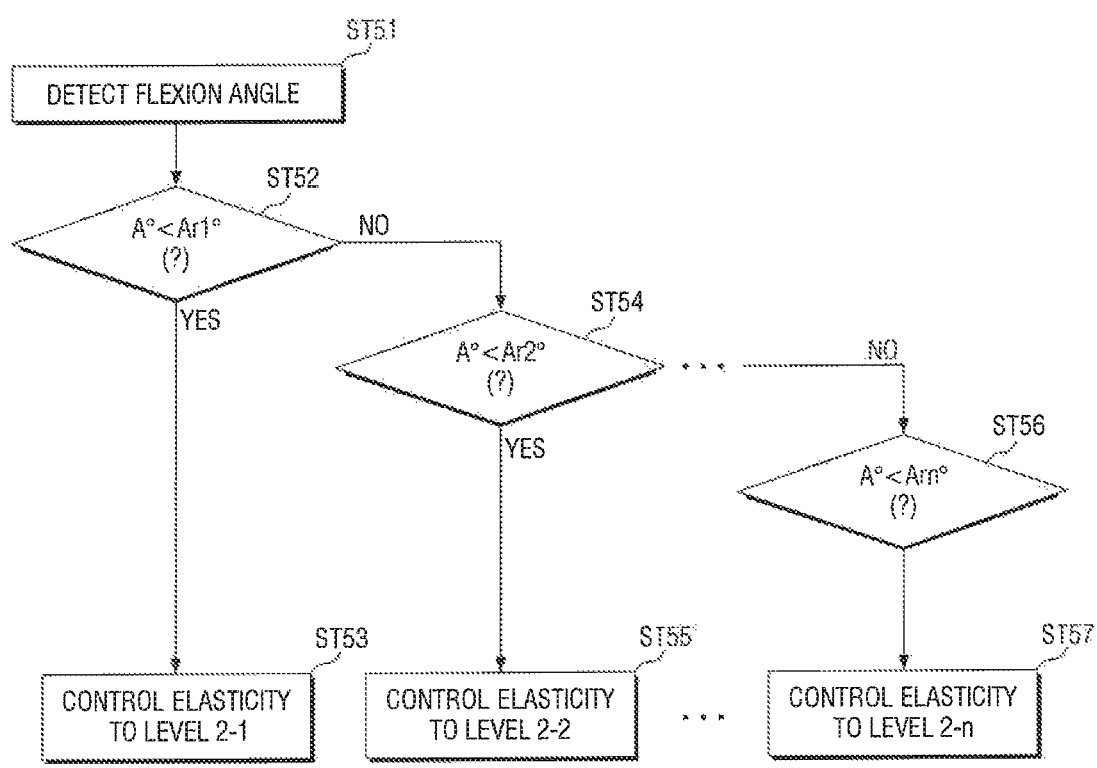
FIG. 8 is a flowchart for illustrating a process of adjusting an elastic force in response to the detection of the flexion angle of FIG. 6 according to an embodiment of the present disclosure.

FIG. 8 is a flowchart for illustrating a process of adjusting an elastic force in response to the detection of the flexion angle of FIG. 6.

The elasticity-adjusting circuit 340 detects the flexion angle of the first folding area FOU1 if it is determined that the first folding area FOU1 is in the flexion shape in the flex mode by at least one Hall sensor in step ST5. The elasticity-adjusting circuit 340 may adjust the elasticity of the elasticity-adjusting unit TMU to different levels in response to a change in the flexion angle A° of the first folding area FOU1 detected by at least one Hall sensor. In an embodiment, if it is determined that the first folding area FOU1 is in the flexion shape, the elasticity-adjusting circuit 340 detects the flexion angle A° of the first folding area FOU1. Subsequently, the elasticity-adjusting circuit 340 sequentially compares the flexion angle A° of the first folding area with predetermined first to n$^{th}$ reference angles AR1° to ARn° in steps ST52, ST54 and ST56.

For example, the elasticity-adjusting circuit 340 may first compare the flexion angle A° with a predetermined first reference angle AR1°, and if the flexion angle A° is less than the first reference angle AR1°, the elasticity-adjusting circuit 340 may supply the elastic control signal of Level 2-1 to the power supply in step ST53. Alternatively, if the flexion angle A° is greater than or equal to the first reference angle AR1°, the flexion angle A° is compared with a second reference angle AR2° that is greater than the first reference angle AR1°. If the flexion angle A° is less than the second reference angle AR2°, the elastic control signal of Level 2-2 may be supplied to the power supply in step ST55. If the flexion angle A° is greater than or equal to the second reference angle AR2°, the flexion angle A° is compared with the n$^{th}$ reference angle ARn° that is greater than the second reference angle AR2° and the elasticity-adjusting circuit 340 may supply the elastic control signal of Level 2-n to the power supply in step S57.

As such, the elasticity-adjusting circuit 340 may supply an elastic control signal of one of Level 2-1 to Level 2-n based on the results obtained by sequentially comparing the flexion angle A° of the first folding area FOU1 with the first to n$^{th}$ reference angles AR1° to ARn°. Accordingly, the power supply supplies a driving voltage corresponding to one of Level 2-1 to Level 2-n to the elasticity-adjusting unit TMU, so that the elastic modulus of the elasticity-adjusting unit TMU is adjusted to one of Level 2-1 to Level 2-n. The magnitudes of the driving voltages corresponding to the Level 2-1 to Level 2-n may be larger than the magnitudes of the driving voltages corresponding to Level 1-1 to Level 1-n, respectively.

Figure 9:
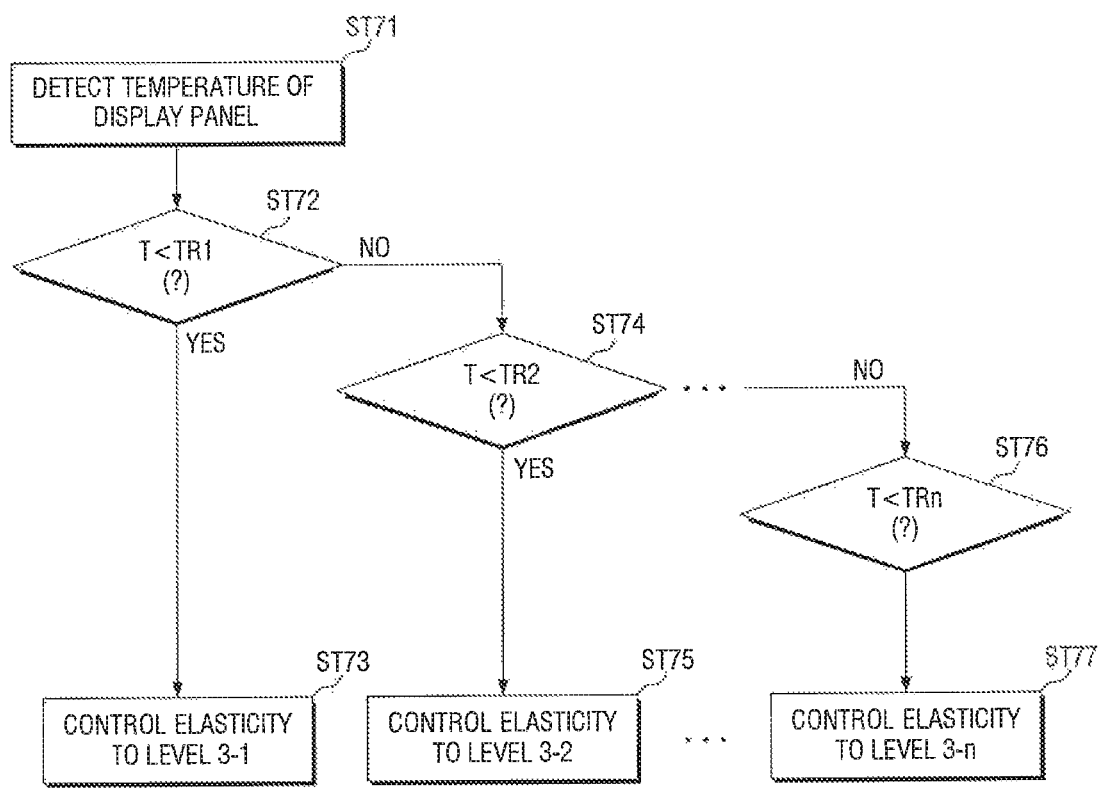
FIG. 9 is a flowchart for illustrating a process of adjusting an elastic force in response to the detection of the driving state of FIG. 6 according to an embodiment of the present disclosure.

FIG. 9 is a flowchart for illustrating a process of adjusting an elastic force in response to the detection of the driving state of FIG. 6.

Referring to FIG. 9, the elasticity-adjusting circuit 340 may detect if the first folding area FOU1 is changed into a flat shape (e.g., a fully unfolded state) and if an electronic pen is being used in the flat shape. If it is determined that no electronic pen is being used, the elasticity-adjusting circuit 340 may adjust the elasticity of the elasticity-adjusting unit TMU to different levels in response to a change in the temperature of the display panel 300 in step ST7. In an embodiment, the elasticity-adjusting circuit 340 detects the temperature of the display panel 300 through the inside temperature sensor when the first folding area FOU1 is in the flat shape in step S71. Subsequently, the elasticity-adjusting circuit 340 sequentially compares the panel temperature value T detected through the inside temperature sensor with predetermined first to n$^{th}$ panel temperature values TR1 to TRn in steps ST73, ST74 and ST76.

For example, the elasticity-adjusting circuit 340 may first compare the panel temperature value T with a predetermined first panel temperature value TR1, and if the panel temperature value T is less than the first panel temperature value TR1, the elasticity-adjusting circuit 340 may supply the elastic control signal of Level 3-1 to the power supply in steps ST72 and ST73. Alternatively, if the panel temperature value T is greater than or equal to the first reference temperature value TR1, the panel temperature value T is compared with a second panel temperature value TR2 that is greater than the first panel temperature value TR1 in step ST74. If the panel temperature value T is less than the second panel temperature value TR2, the elastic control signal of Level 3-2 may be supplied to the power supply in step T75. If the panel temperature value T is greater than or equal to the second panel temperature value TR2, the panel temperature value T is compared with the n$^{th}$ panel temperature value TRn that is greater than the second panel temperature value TR2 in step ST76 and the elasticity-adjusting circuit 340 may supply the elastic control signal of Level 3-n to the power supply in step S77.

As such, the elasticity-adjusting circuit 340 may supply an elastic control signal of one of Level 3-1 to Level 3-n based on the results obtained by sequentially comparing the panel temperature value T with the first to ne panel temperature values TR1 to TRn. Accordingly, the power supply supplies a driving voltage corresponding to one of Level 3-1 to Level 3-n to the elasticity-adjusting unit TMU, so that the elastic modulus of the elasticity-adjusting unit TMU is adjusted to one of Level 3-1 to Level 3-n. The magnitudes of the driving voltages corresponding to the Level 3-1 to Level 3-n may be larger than the magnitudes of the driving voltages corresponding to Level 2-1 to Level 2-n, respectively.

Figure 10:
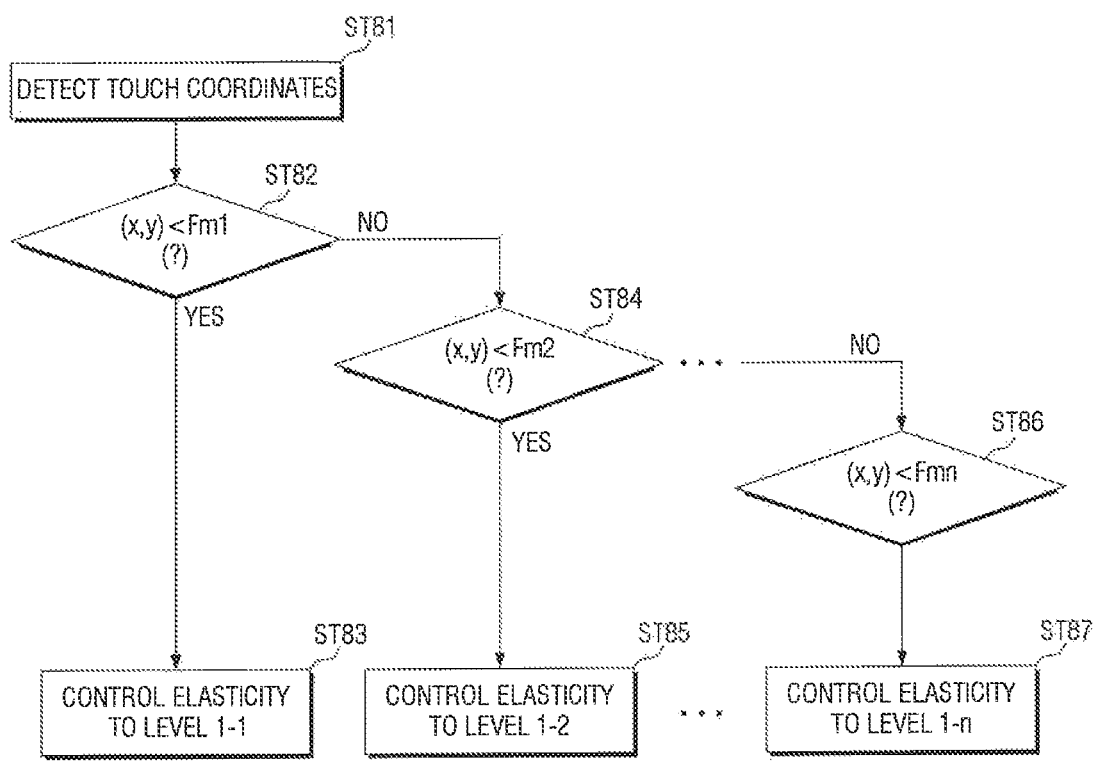
FIG. 10 is a flowchart for illustrating a process of adjusting an elastic force in response to the detection of the location of the touch pen of FIG. 6 according to an embodiment of the present disclosure.
Figure 11:
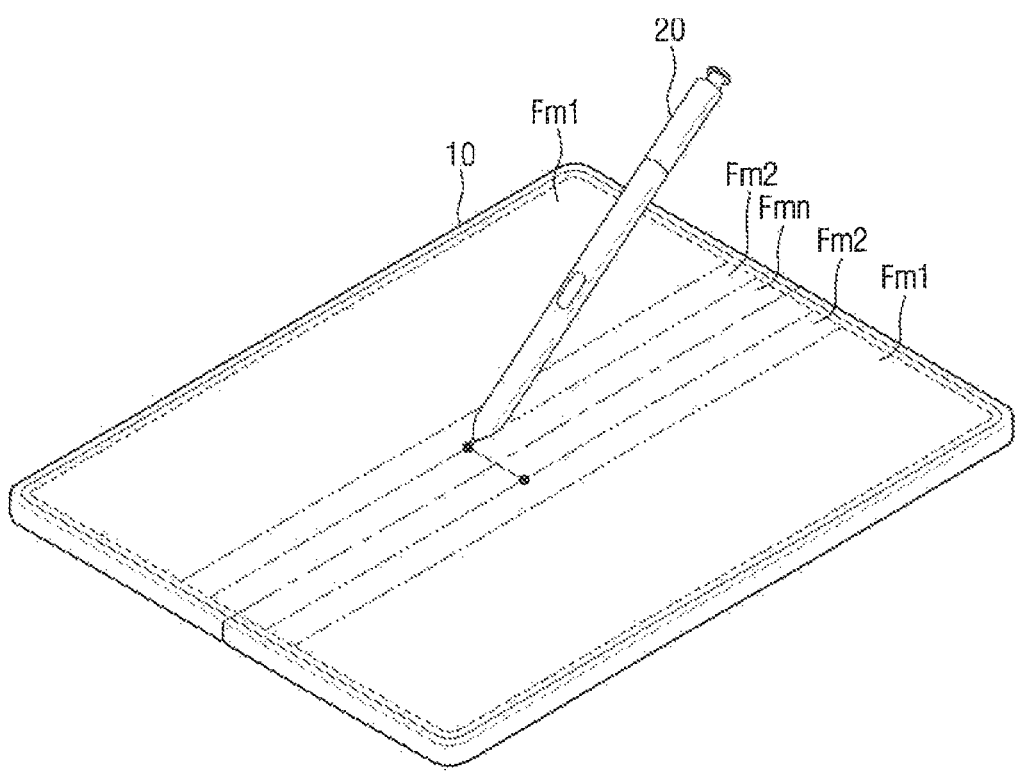
FIG. 11 is a perspective view for illustrating a method of detecting a location of a touch pen of a display device according to an embodiment of the present disclosure.

FIG. 10 is a flowchart for illustrating a process of adjusting an elastic force in response to the detection of the location of the touch pen of FIG. 6. FIG. 11 is a perspective view for illustrating a method of detecting a location of a touch pen of a display device in detail.

Referring to FIGS. 10 and 11, the elasticity-adjusting circuit 340 may determine the location at which an electronic pen 20 is touched if the electronic pen 20 is detected as being used in the flat shape, and the elasticity-adjusting circuit 340 may adjust the elasticity of the elasticity-adjusting unit TMU to different levels according to the changes in the location of the electronic pen 20 on the display panel 300 in step ST8. In an embodiment, when the first folding area FOU1 is flat, the elasticity-adjusting circuit 340 receives touch coordinates from the main processor 710 or the touch driver circuit 330 to determine the location at which the user's electronic pen 20 is touched. At this time, the elasticity-adjusting circuit 340 sequentially compares the received touch coordinates (x, y) with predetermined first to n$^{th}$ area coordinate data Fm1 to Fmn in steps ST82, ST84 and ST86. The predetermined first to n$^{th}$ area coordinate data Fm1 to Fmn is coordinate information that is set from the first area coordinate data Fm1 farthest from the first folding area FOU1 to the n$^{th}$ area coordinate data Fmn corresponding to the first folding area FOU1 with respect to the first folding area FOU1.

Accordingly, the elasticity-adjusting circuit 340 may first compare the touch coordinates (x, y) from the touch driver circuit 330 with the predetermined coordinate data Fm1 of the first area, and if the touch coordinates (x, y) match the coordinate data included in the coordinate data Fm1 of the first area, the elasticity-adjusting circuit 340 may supply the elastic control signal of Level 4-1 to the power supply in steps ST82 and ST83. Alternatively, if the touch coordinates (x, y) do not match the coordinate data Fm1 of the first area, the elasticity-adjusting circuit 340 may compare the touch coordinates (x, y) to determine if they match the coordinate data Fm2 of the second area in step ST84. If the touch coordinates (x, y) match the coordinate data Fm2 of the second area, the elastic control signal of Level 4-2 may be supplied to the power supply in step ST85. If the touch coordinates (x, y) do not match the coordinate data Fm2 of the second area, the elasticity-adjusting circuit 340 may compare the touch coordinates (x, y) to determine if they match the coordinate data Fmn of the n$^{th}$ area in step ST86. If the touch coordinates (x, y) match the coordinate data included in the coordinate data Fmn of the $n^{th}$ area, the elastic control signal of Level 4-n may be supplied to the power supply in step ST87.

As such, the elasticity-adjusting circuit 340 may supply an elastic control signal of one of Level 4-1 to Level 4-n based on the results obtained by sequentially comparing the touch coordinates (x, y) with the predetermined first to $n^{th}$ area coordinate data Fm1 to Fmn. Accordingly, the power supply supplies a driving voltage corresponding to one of Level 4-1 to Level 4-n to the elasticity-adjusting unit TMU, so that the elastic modulus of the elasticity-adjusting unit TMU is adjusted to one of Level 4-1 to Level 4-n. The magnitudes of the driving voltages corresponding to the Level 4-1 to Level 4-n may be larger than the magnitudes of the driving voltages corresponding to Level 3-1 to Level 3-n, respectively.

Figure 12:
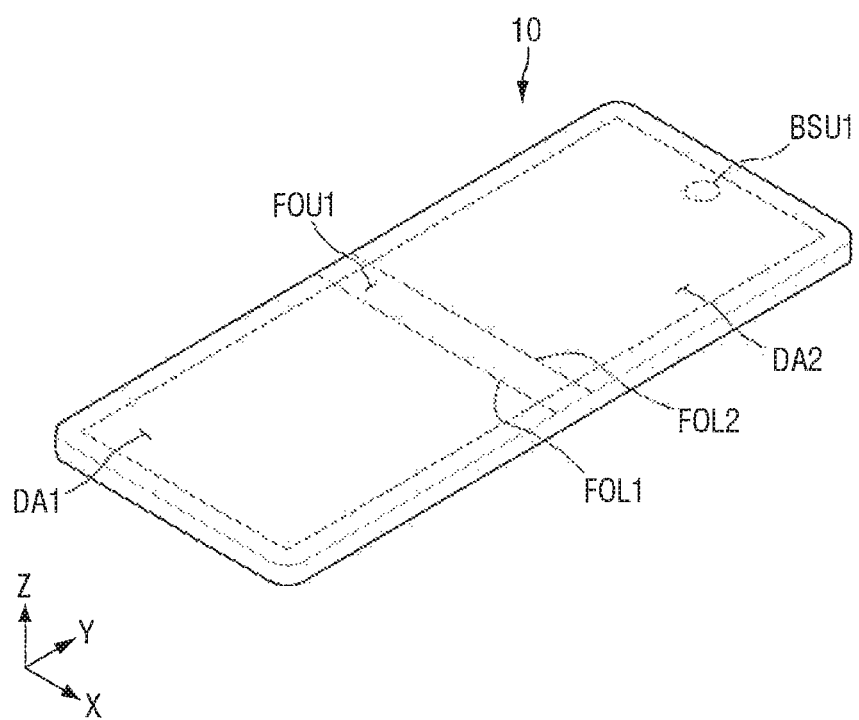
FIG. 12 is a perspective view showing a display device according to an embodiment of the present disclosure.
Figure 13:
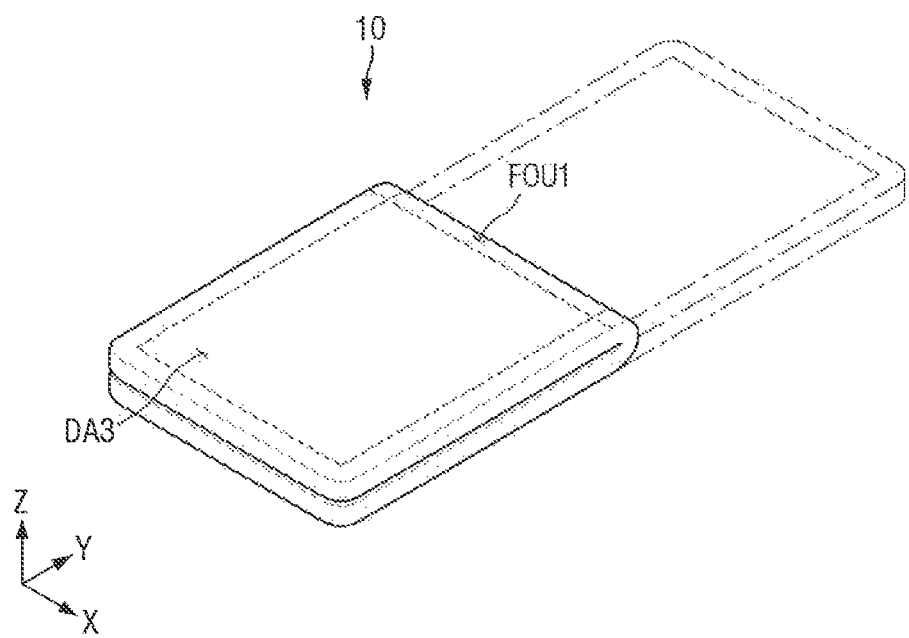
FIG. 13 is a perspective view showing the display device in a folded state according to an embodiment of the present disclosure.

FIG. 12 is a perspective view showing a display device according to an embodiment of the present disclosure. FIG. 13 is a perspective view showing the display device according to an embodiment of FIG. 13 in a folded state.

In the example shown in FIGS. 12 and 13, a display device 10 is a foldable display device that is folded in the second direction (y-axis direction). The display device 10 may remain folded as well as unfolded.

The foldable display device folded in the second direction (y-axis direction) may also include a first folding area FOU1, a first non-folding area DA1 and a second non-folding area DA2. The first folding area FOU1 may be a part of the display device 10 that can be folded. The first non-folding area DA1 and the second non-folding area DA2 may be parts of the display device 10 that cannot be folded.

The first folding area FOU1 may be disposed in the second direction (y-axis direction) and may be extended in the first direction (x-axis direction). The first non-folding area DA1 may be disposed on one side, e.g., the lower side of the first folding area FOU1 (e.g., in the y-axis direction). The second non-folding area DA2 may be located on the opposite side, e.g., on the upper side of the first folding area FOU1 (e.g., in the y-axis direction). The first folding area FOU1 may be an area bent by a predetermined curvature at the first folding line FOL1 and the second folding line FOL2. Therefore, the first folding line FOL1 may be the boundary between the first folding area FOU1 and the first non-folding area DA1, and the second folding line FOL2 may be the boundary between the first folding area FOU1 and the second non-folding area DA2. In an embodiment, the first folding area FOU1 may be folded in the second direction (y-axis direction), and the first and second non-folding areas DA1 and DA2 may be folded in the second direction (y-axis direction) by folding the first folding area FOU1. However, embodiments of the present disclosure are not necessarily limited thereto. For example, in an embodiment the first folding area FOU1 may be extended in a diagonal direction of the display device 10 between the first direction (x-axis direction) and the second direction (y-axis direction). In this embodiment, the display device 10 may be folded in a triangle shape.

When the first folding area FOU1 is extended in the first direction (x-axis direction), the length of the first folding area FOU1 in the second direction (y-axis direction) may be less than the length in the first direction (x-axis direction). In addition, the length of the first non-folding area DA1 in the second direction (y-axis direction) may be greater than the length of the first folding area FOU1 in the second direction (y-axis direction). The length of the second non-folding area DA2 in the second direction (y-axis direction) may be greater than the length of the first folding area FOU1 in the second direction (y-axis direction).

An elasticity-adjusting unit TMU may also be included in the first folding area FOU1 of the foldable display device folded in the second direction (y-axis direction), which can adjust elasticity and thickness change in the third direction (z-axis direction) that is the thickness direction of the first folding area FOU1. The elasticity-adjusting unit TMU of the first folding area FOU1 may be formed to have a width substantially equal to the width of the first folding area FOU1 and may be included in the first folding area FOU1. The elasticity of the elasticity-adjusting unit TMU may be changed in accordance with the folding shape, the flexion angle and the flat shape of the first folding area FOU1, so that the elasticity and the thickness of the first folding area FOU1 are partially changed.

Figure 14:
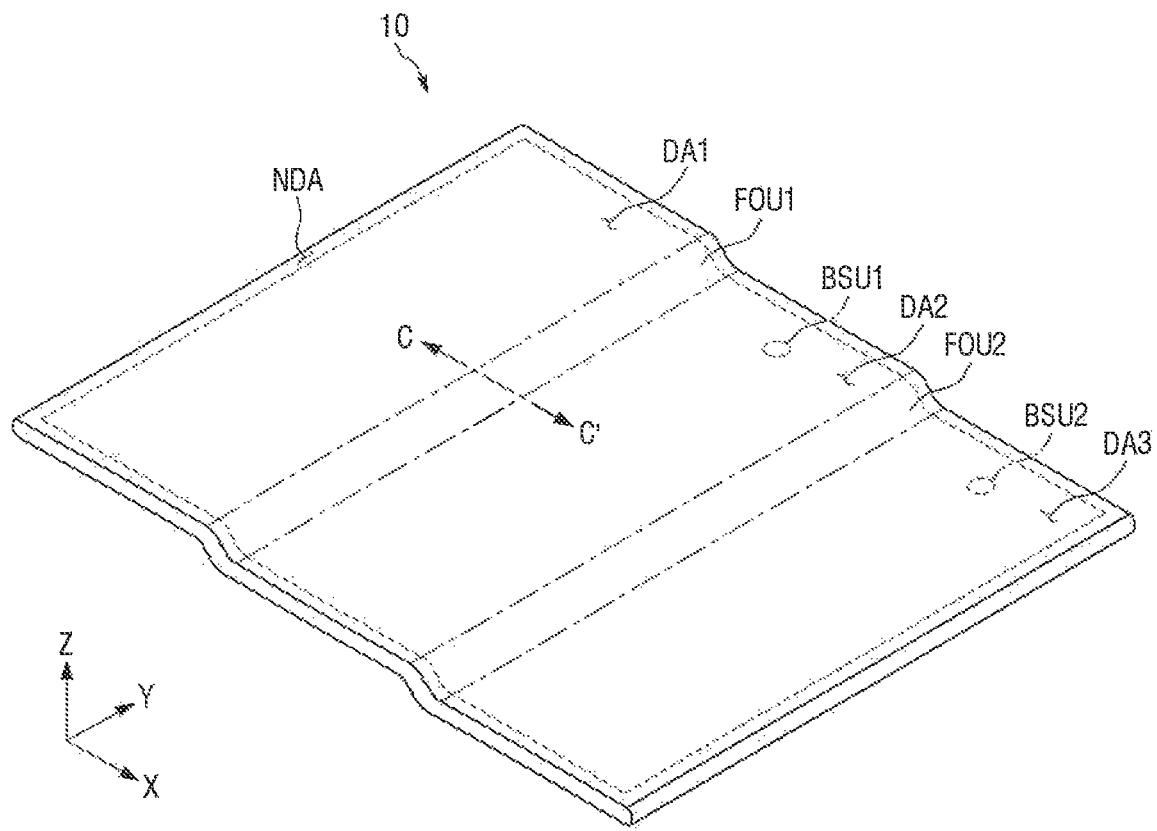
FIG. 14 is a perspective view showing a display device according to an embodiment of the present disclosure.
Figure 15:
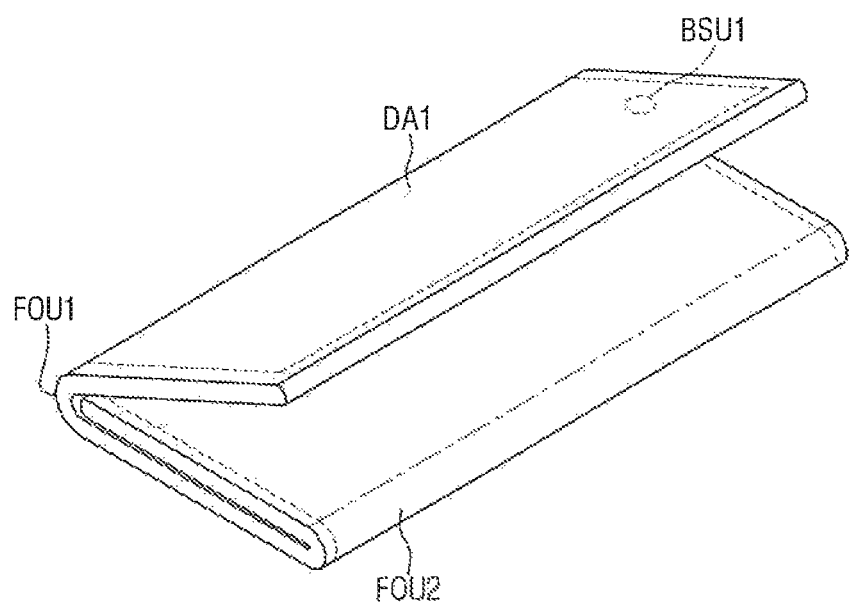
FIG. 15 is a perspective view showing the display device shown in FIG. 14 in a multi-folding state according to an embodiment of the present disclosure.

FIG. 14 is a perspective view showing a display device according to an embodiment of the present disclosure. FIG. 15 is a perspective view showing the display device shown in FIG. 14 in a multi-folding state.

In embodiments shown in FIGS. 14 and 15, a display device 10 is a multi-foldable display device that can be folded multiple times in the first direction (x-axis direction). The display device 10 may remain folded at least once as well as unfolded. The display device 10 may be folded inward such that the front surface where images are displayed is located inside (e.g., an in-folding manner). When the display device 10 is bent or folded in the in-folding manner, a part of the front surface of the display device 10 may face the other part of the front surface. In an embodiment, the display device 10 may be folded outward such that the front surface where images are displayed is located outside (e.g., in an out-folding manner). When the display device 10 is bent or folded in the out-folding manner, a part of the rear surface of the display device 10 may face the other part of the rear surface.

The entire image display area of the display device 10 may be divided into a plurality of non-folding areas DA1 to DA3 and one or more folding areas FOU1 and FOU2. As an example, the first and second folding areas FOU1 and FOU2 may be located at different positions, respectively, in the first direction (x-axis direction) and may be extended in the second direction (y-axis direction). Accordingly, the first and second non-folding areas DA1 and DA2 may be arranged in the first direction (x-axis direction) with the first folding area FOU1 therebetween, and the second and third non-folding areas DA2 and DA3 may be arranged in the first direction (x-axis direction) with the second folding area FOU2 therebetween. In addition, a non-display area NDA may be formed at the border of the entire image display area, such as the borders of the plurality of non-folding areas DA1 to DA3 and the one or more folding areas FOU1 and FOU2.

The first folding area FOU1 may be disposed between the first and second non-folding areas DAL and DA2 and extended in the second direction (y-axis direction). In addition, the first folding area FOU1 may be folded inward or outward in the first direction (x-axis direction). Accordingly, when the first folding area FOU1 is folded outward, the rear surfaces of the first and second non-folding areas DA1 and DA2 may face each other. When the first folding area FOU1 is folded inward, the front surfaces of the first and second non-folding areas DA1 and DA2 may face each other. As such, when the first folding area FOU1 is extended in the second direction (y-axis direction) and is folded inward or outward in the first direction (x-axis direction), the width of the display device 10 in the first direction (x-axis direction) may be reduced to approximately two-third.

The second folding area FOU2 may be disposed between the second and third non-folding areas DA2 and DA3 and extended in the second direction (y-axis direction). In addition, the second folding area FOU2 may be folded inward or outward in the first direction (x-axis direction). When the second folding area FOU2 is folded inward, the front surfaces of the second and third non-folding areas DA2 and DA3 may face each other. When the second folding area FOU2 is folded outward, the rear surfaces of the second and third non-folding areas DA2 and DA3 may face each other. As such, when the second folding area FOU2 is extended in the second direction (y-axis direction) and is folded inward or outward in the first direction (x-axis direction), the width of the display device 10 in the first direction (x-axis direction) may be reduced to approximately two-third.

As shown in FIGS. 14 and 15, the display device 10 may be a G-type or inverted G-type foldable display device, in which the first and second folding areas FOU1 and FOU2 are folded inward so that front surfaces of the second and third non-folding areas DA2 and DA3 face each other, while the front surface of the first non-folding area DA1 faces the rear surface of the third non-folding area DA3. When such a G-type or inverted G-type foldable display device is folded, the length of the display device 10 in the first direction (the x-axis direction) can be reduced to approximately one-third, so that a user can carry the display device 10 easily.

In an embodiment, the multi-foldable display device 10 may be a S-type or inverted S-type foldable display device, in which the first folding area FOU1 is folded outward so that rear surfaces of the first and second non-folding areas DA1 and DA2 face each other, while the second folding area FOU2 is folded inward so that the front surfaces of the second and third non-folding areas DA2 and DA3 face each other. When the first and second folding areas FOU1 and FOU2 both are folded inward or outward in such a S-type or inverted S-type foldable display device, the width of the display device 10 in the first direction (the x-axis direction) can be reduced to approximately one-third, so that a user can carry the display device 10 easily.

An elasticity-adjusting unit TMU may also be included in each of the first and second folding areas FOU1 and FOU2 of the multi-foldable display device 10, which can adjust elasticity and thickness change in the third direction (z-axis direction) that is the thickness direction of the first and second folding areas FOU1 and FOU2. The elasticity-adjusting unit TMU included in each of the first and second folding areas FOU1 and FOU2 may be formed to have a width equal to the width of the first and second folding areas FOU1 and FOU2 and may be included in the first and second folding areas FOU1 and FOU2. The elasticity of each elasticity-adjusting unit TMU may be changed in accordance with the folding shape, the flexion angle and the flat shape of the first and second folding areas FOU1 and FOU2, so that the elasticity and the thickness of the first and second folding areas FOU1 and FOU2 are partially changed.

Figure 16:
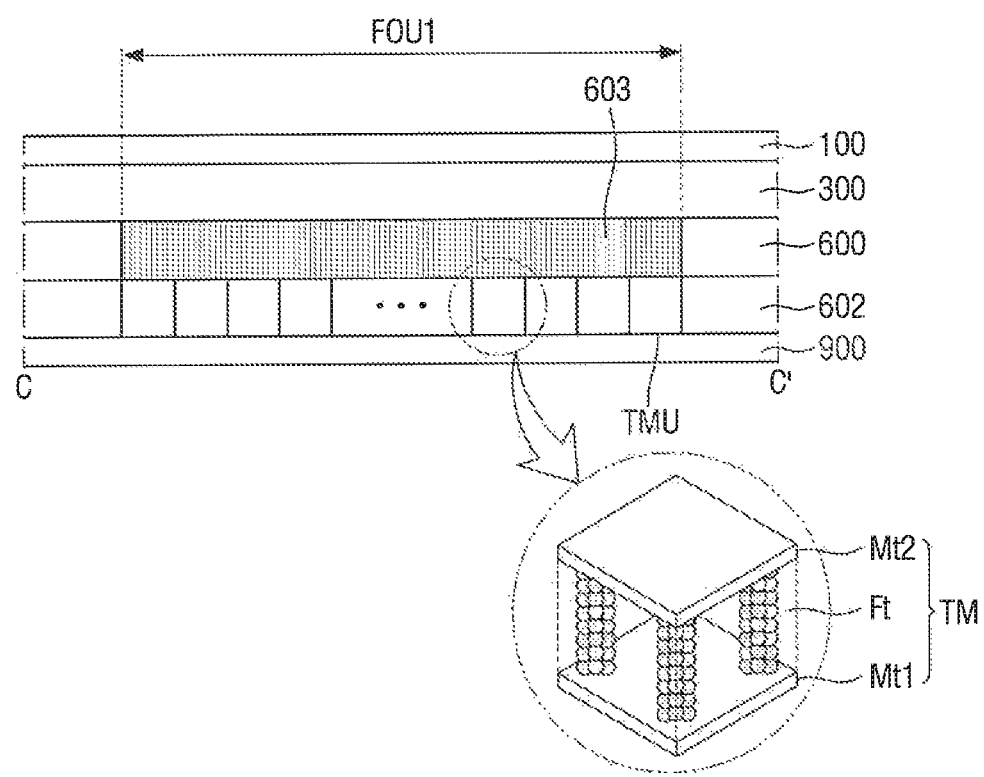
FIG. 16 is a cross-sectional view schematically showing the structure of the first folding area and an elasticity-adjusting module, taken along line C-C of FIG. 14 according to an embodiment of the present disclosure.

FIG. 16 is a cross-sectional view schematically showing the structure of the first folding area and an elasticity-adjusting module, taken along line C-C of FIG. 14.

Referring to FIG. 16, a bracket 600 having a planar area equal to the width of the rear surface of the display panel 300 may be disposed on the rear surface of the display panel 300.

For example, the bracket 600 may have a planar area equal to the widths of the first non-folding area DA1, the first folding area FOU1 and the second non-folding area DA2 of the display panel 300. The bracket 600 may be disposed on the rear surfaces of the first non-folding area DA1, the first folding area FOU1 and the second non-folding area DA2. A folding portion of the bracket 600 corresponding to the first folding area FOU1 of the display panel 300 may be formed in a grid shape so that it can be folded. An elasticity-adjusting unit TMU may be disposed on the rear surface of the bracket 600 corresponding to the first folding area FOU1 of the display panel 300, with a width equal to the width of the first folding area FOU1. Accordingly, in an embodiment supporters for covering level differences may be further disposed on at least one side surface of the elasticity-adjusting unit TMU, and the elasticity-adjusting unit TMU may be disposed between the supporters when viewed from the top.

When the elasticity-adjusting unit TMU includes one elasticity-adjusting member TM, the one elasticity-adjusting member TM has the same width as the first folding area FOU1 when viewed from the top and may be disposed on the rear surface of the bracket 600. Alternatively, when the elasticity-adjusting unit TMU includes a plurality of elasticity-adjusting members TM, the plurality of elasticity-adjusting members TM may be arranged on the rear surface of the bracket 600 in line with the first folding area FOU1 in an N×M arrangement when viewed from the top. The elasticity-adjusting members TM of the N×M arrangement may also be disposed on the rear surface of the first folding area FOU1 with the same planar area as the first folding area FOU1.

Figure 17:
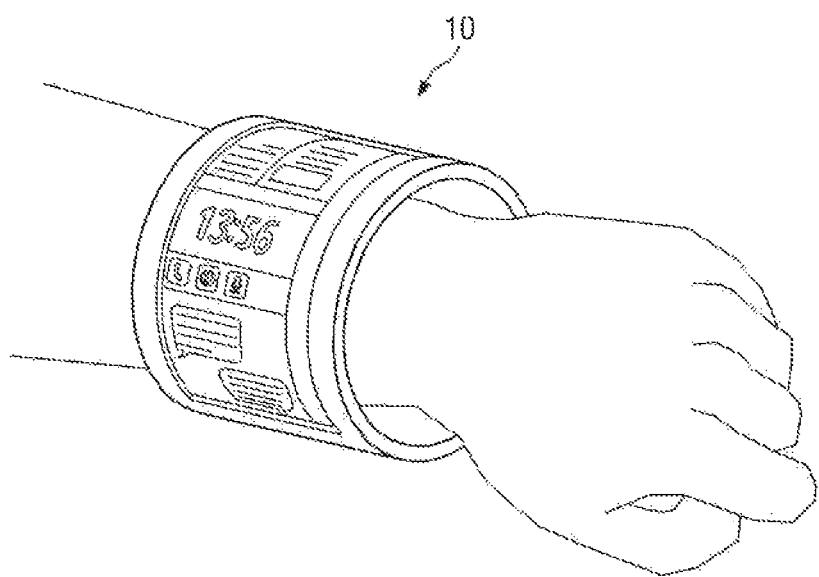
FIG. 17 is a perspective view showing a rollable display device according to an embodiment of the present disclosure.
Figure 18:
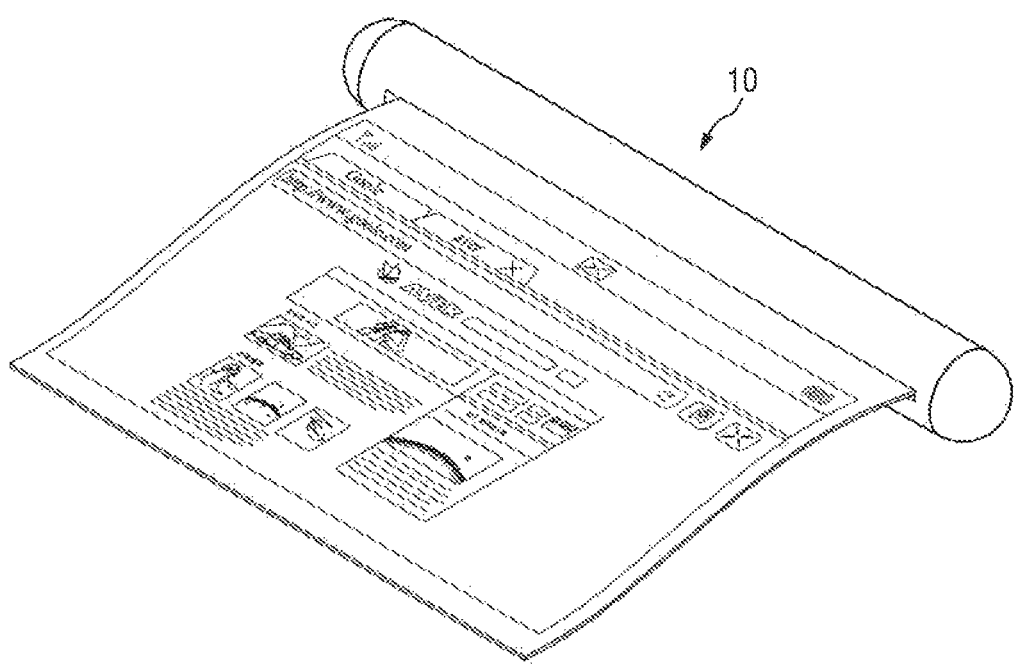
FIG. 18 is a perspective view showing a rollable display device according to an embodiment of the present disclosure.

FIG. 17 is a perspective view showing a rollable display device according to an embodiment of the present disclosure. FIG. 18 is a perspective view showing a rollable display device according to an embodiment of the present disclosure.

Referring to FIGS. 17 and 18, a rollable display device 10 may be employed as a display unit of a portable electronic device such as a tablet PC, a mobile communications terminal, an electronic notebook, an electronic book, and an ultra mobile PC (UMPC). A display panel 300 of the rollable display device 10 may be curved and rolled in the first direction (x-axis direction) or in the second direction (y-axis direction). As shown in an embodiment of FIG. 17, the rollable display device 10 may be wearable, such as around the user's wrist. As shown in FIG. 18, the rollable display device 10 may be unwound from or retracted inside a holder.

In an embodiment, the elasticity-adjusting unit TMU may be disposed entirely on the rear surface of the display panel 300 so that the display panel 300 has elasticity so that no wrinkle is formed while being rolled in the first direction (x-axis direction) or the second direction (y-axis direction).

Figure 19:
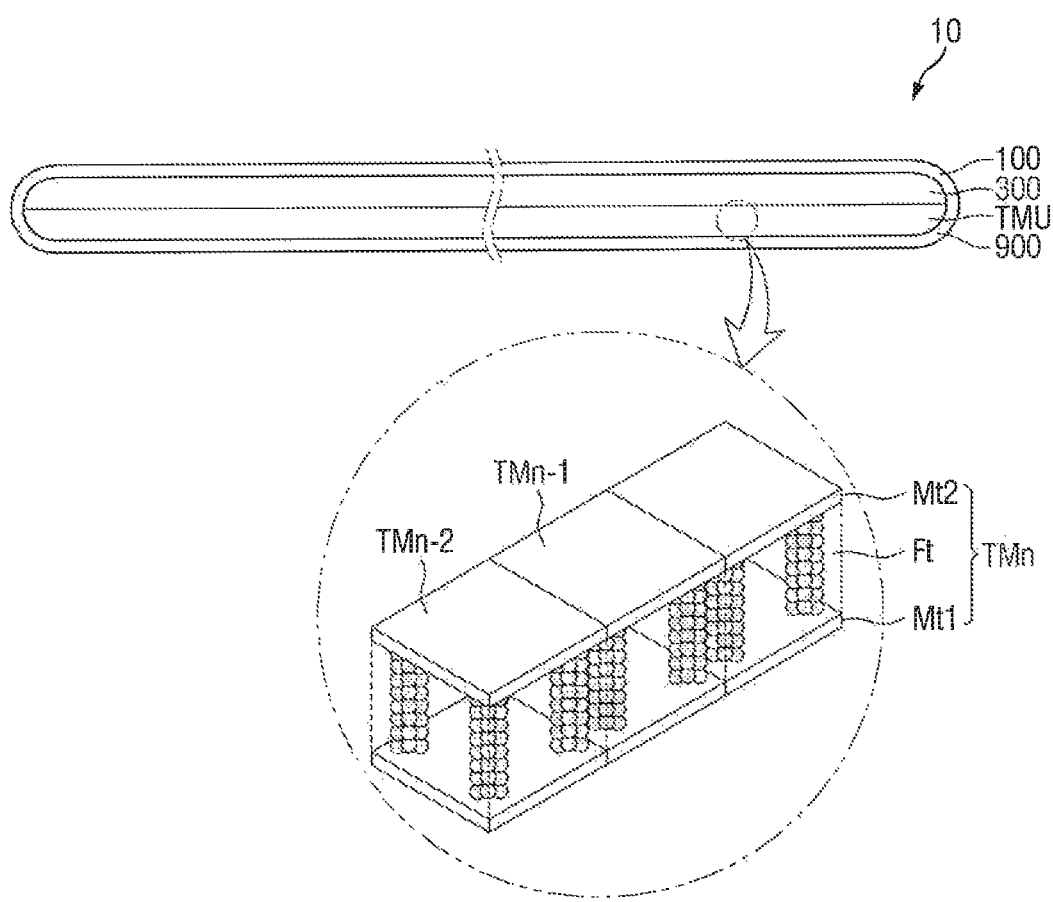
FIG. 19 is a cross-sectional view showing an arrangement structure of an elasticity-adjusting module applied to a rollable display device according to an embodiment of the present disclosure.

FIG. 19 is a cross-sectional view showing an arrangement structure of an elasticity-adjusting module applied to a rollable display device.

Referring to FIG. 19, an elasticity-adjusting unit TMU having a planar area equal to the width of the rear surface of the display panel 300 may be disposed on the rear surface of the display panel 300. In an embodiment, the elasticity-adjusting unit TMU may have a width equal to the image display area of the display panel 300.

When the elasticity-adjusting unit TMU includes one elasticity-adjusting member TM, the one elasticity-adjusting member TM has the same width as the display panel 300 when viewed from the top and may be disposed on the rear surface of the display panel 300. Alternatively, when the elasticity-adjusting unit TMU includes a plurality of elasticity-adjusting members TM, the plurality of elasticity-adjusting members TM may be arranged on the rear surface of the display panel 300 in an N×M arrangement when viewed from the top. The elasticity-adjusting members TM of the N×M arrangement may also be disposed on the rear surface of the display panel 300, with the same planar area as the display panel 300.

With the above-described configurations, the elastic force of the first and second folding areas FOU1 and FOU2 can be adjusted in response to changes of the usage state and the usage environment according to the folding mode, the flex mode, the flat mode, the electronic pen usage mode, etc. of the display device 10 according to embodiments, so that the robustness of the first and second folding areas FOU1 and FOU2 can be increased, and wrinkles can be prevented.

In addition, according to an embodiment, the elastic force of at least one of the first and second folding areas FOU1 and FOU2 of the display device 10 is changed according to a touch location of a finger or an electronic pen, etc., so that the durability of the folding areas can be increased and the user's reliability and satisfaction can be increased.

Although embodiments of the present disclosure have been described with reference to the accompanying drawings, those skilled in the art would understand that various modifications and alterations may be made without departing from the technical idea or essential features of the present disclosure. Therefore, it should be understood that the above-mentioned embodiments are not limiting.

In concluding the detailed description, those skilled in the art will appreciate that many variations and modifications can be made to the described embodiments without substantially departing from the principles of the present disclosure. Therefore, the described embodiments of the present disclosure are used in a generic and descriptive sense only and not for purposes of limitation.

What is claimed is:

1. A display device comprising: a display panel comprising at least one folding area; at least one elasticity-adjusting unit that changes an elastic force of the at least one folding area; and an elasticity-adjusting circuit adjusting an elastic modulus for the at least one elasticity-adjusting unit in response to a change of a folding state of the at least one folding area, wherein the at least one elasticity-adjusting unit has a total width along the at least one folding area substantially equal to a width of the at least one folding area and the at least one elasticity-adjusting unit is disposed on a rear surface of the at least one folding area; and the at least one elasticity-adjusting unit comprises at least one elasticity-adjusting member, wherein the at least one elasticity-adjusting member comprises a first planar electrode and a second planar electrode in parallel to the first planar electrode with an elastic member having a variable elastic modulus interposed therebetween.

2. The display device of claim 1, wherein the at least one folding area is disposed between a plurality of non-folding areas and is foldable inwardly or outwardly in a first direction or a second direction that crosses the first direction.

3. The display device of claim 1, wherein:
the elasticity-adjusting circuit generates a control signal to a power supply connected to the at least one elasticity-adjusting unit for adjusting the elastic modulus of the at least one elasticity-adjusting unit in a third direction, wherein the adjusting of the elastic modulus of the at least one elasticity-adjusting unit changes a thickness and elasticity of the at least one folding area in the third direction that is a thickness direction of the at least one folding area.

4. The display device of claim 3, wherein:
the elasticity-adjusting unit comprises one elasticity-adjusting member, wherein the elasticity-adjusting unit is disposed on the rear surface of the at least one folding area and has an area substantially equal to an area of the at least one folding area when viewed from top.

5. The display device of claim 3, wherein:
the elasticity-adjusting unit comprises a plurality of elasticity-adjusting members, wherein the plurality of elasticity-adjusting members are arranged in an N×M arrangement on the rear surface of the at least one folding area and has an area substantially equal to the at least one folding area when viewed from top, wherein N and M are natural numbers that are different from each other.

6. The display device of claim 3, wherein:
each of the first and second planar electrodes is formed of a flexible electrode containing at least one metal or alloy, wherein the elastic member having a variable elastic modulus comprises at least one of a magneto-rheological fluid (MR) module and an electro-rheological fluid (ER) module.

7. The display device of claim 6, wherein:
the power supply supplies a predetermined ground voltage to the first planar electrode;
the power supply supplies a driving voltage corresponding to one of different levels based on the control signal to the second planar electrode; and
the elastic member has a variable elastic modulus varying based on a voltage difference between the first planar electrode and the second planar electrode.

8. The display device of claim 3, wherein:
the elasticity-adjusting circuit detects a change in the folding state by detecting a shape of the at least one folding area comprising a folding shape, a flexion shape or a flat shape through at least one inside and outside temperature sensor and at least one Hall sensor; and
the elasticity-adjusting circuit adjusts the elastic modulus of the elasticity-adjusting unit to different levels in response to a change of the folding shape, the flexion shape and the flat shape.

9. The display device of claim 8, wherein the elasticity-adjusting circuit performs at least one of:
a first control mode sensing an outside temperature when the folding shape is detected and adjusting the elastic modulus of the elasticity-adjusting unit to different levels in response to a change in the outside temperature;
a second control mode sensing a change in a flexion angle when the flexion shape is detected and adjusting the elastic modulus of the elasticity-adjusting unit to different levels in response to the change in the flexion angle;
a third control mode determining usage of an electronic pen when the flat shape is detected and adjusting the elasticity of the elasticity-adjusting unit to different levels in response to a temperature change of the display panel if it is determined that no electronic pen is used; and
a fourth control mode determining a touch location of the electronic pen when the flat shape is detected and it is determined that an electronic pen is used and adjusting the elasticity of the elasticity-adjusting unit to different levels in response to a change in the touch location of the electronic pen.

10. The display device of claim 9, wherein:
the elasticity-adjusting circuit sequentially compares a value of the outside temperature with values of predetermined first to $n^{th}$ reference temperatures in the first control mode, and supplies the control signal of one of Level 1-1 to Level 1-n to the power supply based on results of sequentially comparing the value of the outside temperature with the values of the first to $n^{th}$ reference temperatures, wherein n is a natural number greater than or equal to 2,
wherein the power supply supplies a driving voltage corresponding to one of Level 1-1 to Level 1-n to the elasticity-adjusting unit so that the elastic modulus of the elasticity-adjusting unit is changed to a respective elastic modulus corresponding to Level 1-1 to Level 1-n.

11. The display device of claim 9, wherein:
the elasticity-adjusting circuit sequentially compares a flexion angle of the at least one folding area detected through the at least one Hall sensor with predetermined first to $n^{th}$ reference angles in the second control mode, and supplies the control signal of one of Level 2-1 to Level 2-n to the power supply based on results of the sequential comparing, wherein n is a natural number greater than or equal to 2,
wherein the power supply supplies a driving voltage corresponding to one of Level 2-1 to Level 2-n to the elasticity-adjusting unit so that the elastic modulus of the elasticity-adjusting unit is changed to a respective elastic modulus corresponding to Level 2-1 to Level 2-n.

12. The display device of claim 9, wherein:
the elasticity-adjusting circuit detects a panel temperature of the display panel in the third control mode, and supplies the control signal of one of Level 3-1 to Level 3-n to the power supply based on results of sequentially comparing the panel temperature with predetermined first to $n^{th}$ panel temperature values, wherein n is a natural number greater than or equal to 2,
wherein the power supply supplies a driving voltage corresponding to one of Level 3-1 to Level 3-n to the elasticity-adjusting unit so that the elastic modulus of the elasticity-adjusting unit is changed to a respective elastic modulus corresponding to Level 3-1 to Level 3-n.

13. The display device of claim 9, wherein:
the elasticity-adjusting circuit sequentially compares touch coordinates of the electronic pen with predetermined first to $n^{th}$ area coordinate data in the fourth control mode, and supplies the control signal of one of Level 4-1 to Level 4-n to the power supply based on results of the sequential comparing, wherein n is a natural number greater than or equal to 2,
wherein the power supply supplies a driving voltage corresponding to one of Level 4-1 to Level 4-n to the elasticity-adjusting unit so that the elastic modulus of the elasticity-adjusting unit is changed to a respective elastic modulus corresponding to Level 4-1 to Level 4-n.

14. A touch input system comprising: a display device for displaying images; and an electronic pen for a touch input on the display device, wherein the display device comprises: a display panel comprising at least one folding area; at least one elasticity-adjusting unit that changes an elastic force of the at least one folding area; an elasticity-adjusting circuit adjusting an elastic modulus for the at least one elasticity-adjusting unit in response to a change of a shape of the at least one folding area comprising a folding shape, a flexion shape or a flat shape, wherein the at least one elasticity-adjusting has a total width along the at least one folding area substantially equal to a width of the at least one folding area and the at least one elasticity-adjusting unit is disposed on a rear surface of the at least one folding area; and the at least one elasticity-adjusting unit comprises at least one elasticity-adjusting member, wherein the at least one elasticity-adjusting member comprises a first planar electrode and a second planar electrode in parallel to the first planar electrode with an elastic member having a variable elastic modulus interposed therebetween.

15. The system of claim 14, wherein the elasticity-adjusting circuit performs at least one of:
a first control mode sensing an outside temperature when the at least one folding area has a folded shape and adjusts the elastic modulus of the elasticity-adjusting unit to different levels in response to a change in the outside temperature;
a second control mode sensing a change in a flexion angle when the at least one folding area has a flexion shape and adjusting the elastic modulus of the elasticity-adjusting unit to different levels in response to the change in the flexion angle;
a third control mode determining usage of an electronic pen when the at least one folding area has the flat shape and adjusting the elasticity of the elasticity-adjusting unit to different levels in response to a temperature change of the display panel if it is determined that no electronic pen is used; and
a fourth control mode determining a touch location of the electronic pen when the at least one folding area has the flat shape and it is determined that the electronic pen is used and adjusting the elasticity of the elasticity-adjusting unit to different levels in response to a change in the touch location of the electronic pen.

16. The system of claim 15, wherein:
the elasticity-adjusting circuit sequentially compares the outside temperature with predetermined first to $n^{th}$ reference temperatures in the first control mode, and supplies a control signal of one of Level 1-1 to Level 1-n to a power supply connected to the at least one elasticity-adjusting unit based on results of the sequentially comparing, wherein n is a natural number greater than or equal to 2,
wherein the power supply supplies a driving voltage corresponding to one of Level 1-1 to Level 1-n to the elasticity-adjusting unit so that the elastic modulus of the elasticity-adjusting unit is changed to a respective elastic modulus corresponding to Level 1-1 to Level 1-n.

17. The system of claim 15, wherein:
the elasticity-adjusting circuit sequentially compares a flexion angle of the at least one folding area detected through at least one Hall sensor with predetermined first to $n^{th}$ reference angles in the second control mode, and supplies a control signal of one of Level 2-1 to Level 2-n to a power supply connected to the at least one elasticity-adjusting unit based on results of the sequential comparing,
wherein the power supply supplies a driving voltage corresponding to one of Level 2-1 to Level 2-n to the elasticity-adjusting unit so that the elastic modulus of the elasticity-adjusting unit is changed to a respective elastic modulus corresponding to Level 2-1 to Level 2-n.

18. The system of claim 15, wherein:

the elasticity-adjusting circuit detects a panel temperature of the display panel in the third control mode, and supplies a control signal of one of Level 3-1 to Level 3-n to a power supply connected to the at least one elasticity-adjusting unit based on results of sequentially comparing the panel temperature with predetermined first to $n^{th}$ panel temperature values, wherein n is a natural number greater than or equal to 2, wherein the power supply supplies a driving voltage corresponding to one of Level 3-1 to Level 3-n to the elasticity-adjusting unit so that the elastic modulus of the elasticity-adjusting unit is changed to a respective elastic modulus corresponding to Level 3-1 to Level 3-n.

19. The system of claim 15, wherein:

the elasticity-adjusting circuit sequentially compares touch coordinates of the electronic pen with predetermined first to $n^{th}$ area coordinate data in the fourth control mode, and supplies a control signal of one of Level 4-1 to Level 4-n to a power supply connected to the at least one elasticity-adjusting unit based on results of the sequential comparing, wherein n is a natural number greater than or equal to 2, wherein the power supply supplies a driving voltage corresponding to one of Level 4-1 to Level 4-n to the elasticity-adjusting unit so that the clastic modulus of the elasticity-adjusting unit is changed to a respective clastic modulus corresponding to Level 4-1 to Level 4-n.

* * * * *